United States Patent [19]

Marlton et al.

[11] Patent Number: 5,027,212
[45] Date of Patent: Jun. 25, 1991

[54] COMPUTER BASED VIDEO/GRAPHICS DISPLAY SYSTEM

[75] Inventors: Anthony P. Marlton, Saffron Walden; Dennis A. Fielder, Cambridge; Victor G. Halsted, Hempstead; Trevor R. Stockill, Romford, all of United Kingdom

[73] Assignee: Videologic Limited, Hertfordshire, United Kingdom

[21] Appl. No.: 446,924

[22] Filed: Dec. 6, 1989

[51] Int. Cl.⁵ .................. H04N 5/272; H04N 5/262
[52] U.S. Cl. ..................................... 358/183; 358/22; 358/149; 358/148; 358/150; 358/151; 340/721; 340/726; 340/703
[58] Field of Search ................. 358/22, 149, 183, 181, 358/148–151, 310; 340/721, 726, 703

[56] References Cited

U.S. PATENT DOCUMENTS

Re. 31,200  4/1983  Sukonick et al. .
4,197,590   4/1980  Sukonick et al. .
4,631,588  12/1986  Barnes et al. ........................ 358/22
4,670,785   6/1987  Medin ................................ 358/149
4,713,693  12/1987  Southworth et al. ................ 358/22

Primary Examiner—James J. Groody
Assistant Examiner—Glen Burgess
Attorney, Agent, or Firm—Flynn, Thiel, Boutell & Tanis

[57] ABSTRACT

A computer based video/graphics display system includes a computer system (22) having a graphics generator (24). A video signal from a video source (28) is fed through an input stage (26) to an asynchronous converter (30). The converter (30) synchronises the video signal to the graphics generator (24). The output from the asynchronous converter (30) and the output from the graphics generator (24) are fed to a fading/mixing matrix (34). The combined signal output from the fading/mixing matrix is fed to a computer display monitor (14). The system allows the mixing or windowing of computer graphics and a video image on a common display.

30 Claims, 20 Drawing Sheets

| FILTER TYPES AND EQUATIONS | | |
|---|---|---|
| TYPE | EQUATION | DELAY |
| A | (1) | 0.0 |
| B | $(1+z^{-1})/2$ | 0.5 |
| C | $(1+2z^{-1}+z^{-2})/4$ | 1.0 |
| D | $(1+z^{-1})/2 \cdot (1+2z^{-1}+z^{-2})/4$ | 1.5 |
| E | $(1+z^{-1})/2 \cdot (1+2z^{-1}+2z^{-2}+2z^{-3}+z^{-4})/8$ | 3.5 |

*FIG.8*

| HORIZONTAL FILTERING | | |
|---|---|---|
| SIZE RANGE | Y FILTER | Y B/W |
| 100% - 90% | A | 100% |
| 90% - 75% | B | 90% |
| 75% - 60% | C | 70% |
| 60% - 35% | D | 55% |
| 35% - 00% | E | 34% |

*FIG.9*

| VERTICAL FILTERING AND INTERPOLATION | | | |
|---|---|---|---|
| SIZE RATIO | FILTER | BANDWIDTH | INTERPOLATION |
| 100% - 50% | A | 100% | No |
| 50% - 33% | A | 100% | Yes |
| 33% - 00% | B | 90% | Yes |

*FIG.10*

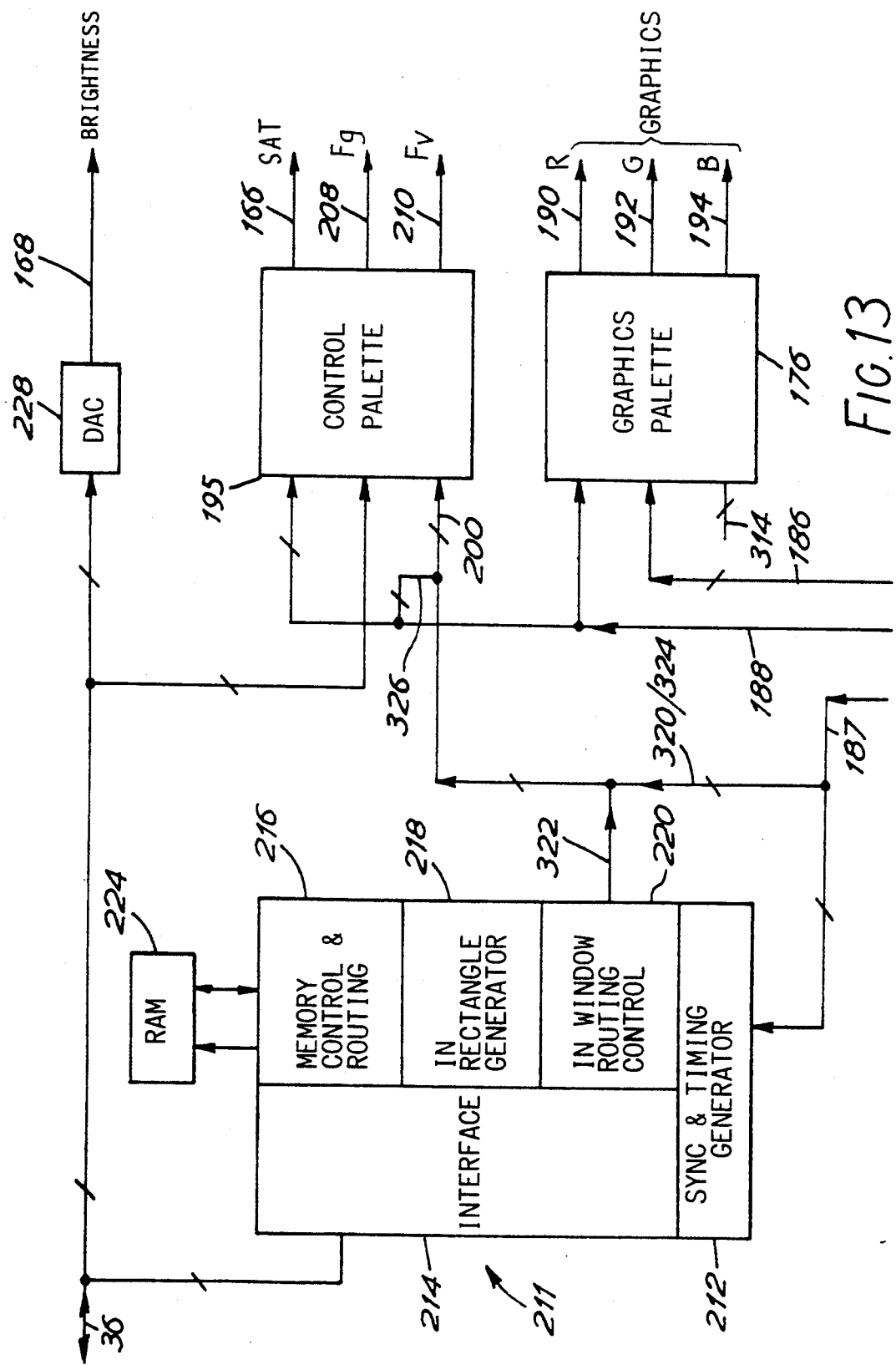

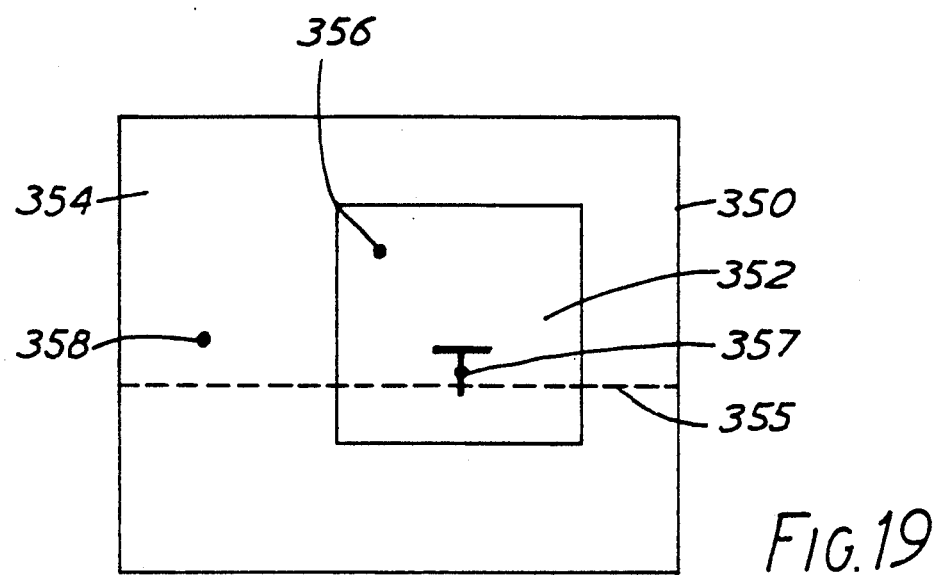
FIG.19
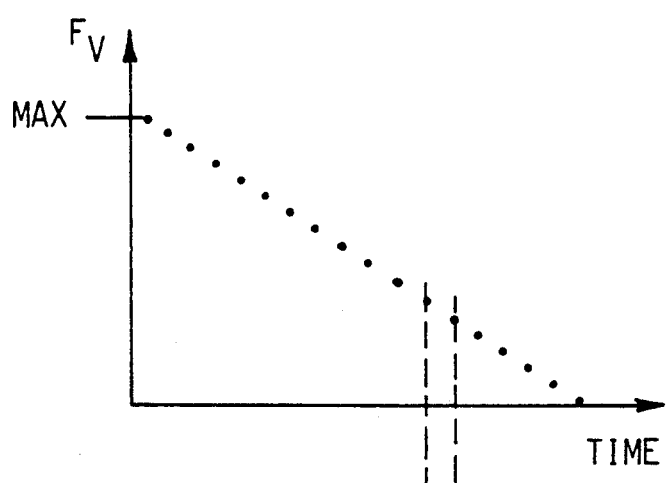
FIG.20
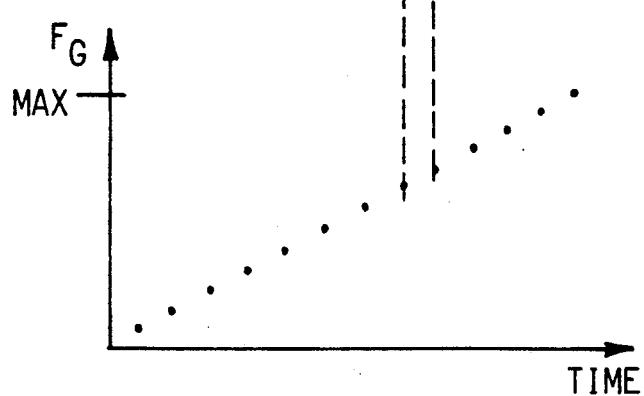

| i | $t_i$ | $x_i$ |
|---|---|---|
| 1 | 1 | 5 |
| 2 | 1 | 3 |
| 3 | 2 | 0 |
| 4 | 1 | 4 |
| 5 | 1 | 7 |

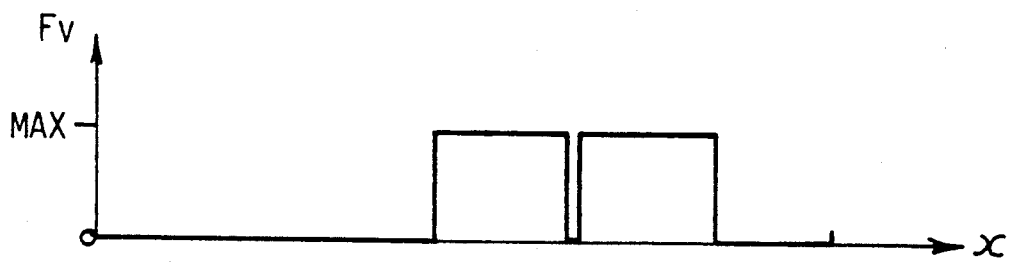
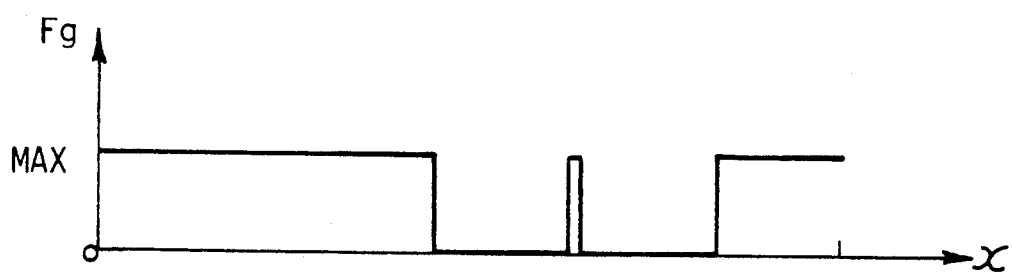
FIG. 29
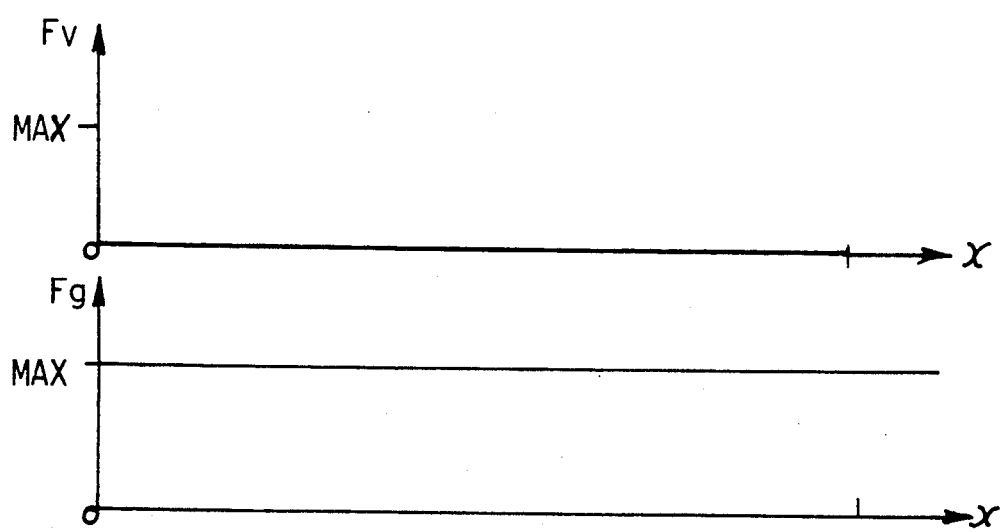
FIG. 30

COMPUTER BASED VIDEO/GRAPHICS DISPLAY SYSTEM

FIELD OF THE INVENTION

The present invention relates to the field of computer based video/graphics display systems. In particular the invention relates to a system for combining video signals and graphics signals on a common display. The graphics signals are generated by a computer, and the video signals are from a video source, such as a video disk player.

BACKGROUND OF THE INVENTION

There are many problems associated with combining video signals with computer graphics signals, but probably the most significant problem is that of synchronising the video and graphics signals so that correct placement of the signals occurs on the combined display.

A method of synchronising the computer graphics signal and the video signal is, for example, known from U.S. Pat. No. 4,599,611. In this method, the computer graphics system takes all its timing signals from the sync signals of the video source. Thus the graphics and video signals are accurately alinged relative to one another. The combined video output signal is also therefore based on the video source timing.

However, such a system limits the graphics display modes in which the computer can operate to only those modes that are compatible with the video source, i.e. that have the same number of horizontal display lines per full screen of display, and that have a line rate substantially the same as that of the video source. This generally restricts the available graphics modes to low resolution modes, thereby not making full use of the graphics capability of the computer.

A further problem is that the aspect ratio for the computer graphics is usually not the same as that for usual standards of video image. Correction of the graphics aspect ratio relative to that of the video cannot easily be achieved when the computer graphics are synchronised to the video source, and hence in the combined display the computer graphics will be distorted. A circle drawn in computer graphics will appear as an ellipse in the combined display. This may limit the usefulness of the computer graphics to that of adding alphanumeric text to the video picture.

A further constraint imposed by synchronising by a generator sync for the computer graphics to the video source is that both the graphics and the video displays necessarily fill the whole of the display area on the screen.

SUMMARY OF THE INVENTION

In the present invention, the computer graphics signal and the video signal are combined using synchronisation from the computer graphics generator. The video signal from the video source is digitally encoded and asynchronously converted to a video signal synchronised to the computer graphics generator. This allows a variety of different video source signal formats to be combined with computer graphics. The combined display can be displayed using a high resolution computer monitor capable of displaying the full resolution of all the computer's graphics modes. Since the video signal is converted asynchronously, effects such as video picture magnification and reduction, as well as aspect ratio correction can be achieved.

A preferred feature of the invention is that the asynchronous video signal converter uses a dual port picture fieldstore. The input port can be clocked at a rate compatible with, and synchronised to, the video signal, and the output port can be clocked at a rate compatible with, and synchronised to, the computer graphics generator. Preferably the asynchronous converter contains two fieldstores. Complete fields of video signal can then be written into each fieldstore alternately, and the converter output can be taken from the fieldstore that contains the most recent full field, i.e. the fieldstore that is not currently being written into. This improves the picture quality of moving video images in the combined display.

Another preferred feature of the invention is a timing synchroniser that is itself synchronised to the computer graphics generator. The synchroniser supplies all timing signals for the video/graphics combining system, as well as output sync signals for the display monitor.

By altering the relative timing and phase of these feature ASIC timing signals, the synchroniser can control the aspect ratio of the video image in the combined display. The synchroniser can also synthesize timing signals and sync signals for the display monitor in the event of an interruption in the sync signals from the computer graphics generator. Such an interruption will occur whenever the graphics mode of the computer is changed. The synthesized output from the synchroniser allows the video display to be maintained on the display monitor. During graphics mode changes, the graphics signals are blanked. When a new graphics mode is started, the sync signals from the graphics generator will reappear, however these will be in random phase to the synthesized sync signals being supplied to the display monitor. To maintain a continuous picture on the display monitor, the synchroniser pulls its synthesized signals back into synchronised lock with the graphics' sync signals, in a controlled manner. Once the timing signals have been resynchronised, the graphics signals can be unblanked. Thus the synchroniser will attempt to cover over the glitch that normally occurs on the display monitor whenever the graphics mode of the computer is changed.

Another preferred feature of the invention is a fading/mixing matrix for combining the video and graphics signals. The matrix is controlled on a pixel by pixel basis, enabling full video, full graphics, or a mixture of video and graphics, to be displayed at each individual pixel position in the combined display. The matrix allows windowing and overlaying of the video and graphics images in the combined display. The matrix can be controlled by the logical colors used in the graphics display. Each logical color is assigned keying/fading attributes, as well as a physical color in the normal manner.

When more than one fieldstore is employed in the asynchronous video converter, another preferred feature of the invention is a dual input switch allowing the video input to be rapidly switched between two video inputs. The switch is controlled in real time to input video fields alternately from the two sources, the inputted fields being stored alternately in the fieldstores. Thus the first fieldstore will contain the video image from one input, and the second fieldstore will contain the video image from the other input. Two independent video windows may then be displayed together with computer generated graphics in the combined display.

BRIEF DESCRIPTION OF THE DRAWINGS

For a better understanding of details and scope of the invention, an embodiment of the invention will now be described by way of example with reference to the accompanying drawings, in which:

FIGS. 8, 9 and 10 are tables showing the filters used in the asynchronous converter of FIG. 4.

FIG. 13 is a block diagram showing a part of the fading/mixing matrix of FIG. 2.

FIG. 19 is a diagrammatic view illustrating an example of the palette.

FIG. 20 is a graph illustrating fading using the palette.

FIGS. 29 and 30 are graphs illustrating operation of the fading palette as in FIGS. 19 and 20.

DESCRIPTION OF AN ILLUSTRATIVE EMBODIMENT

Figure 1:
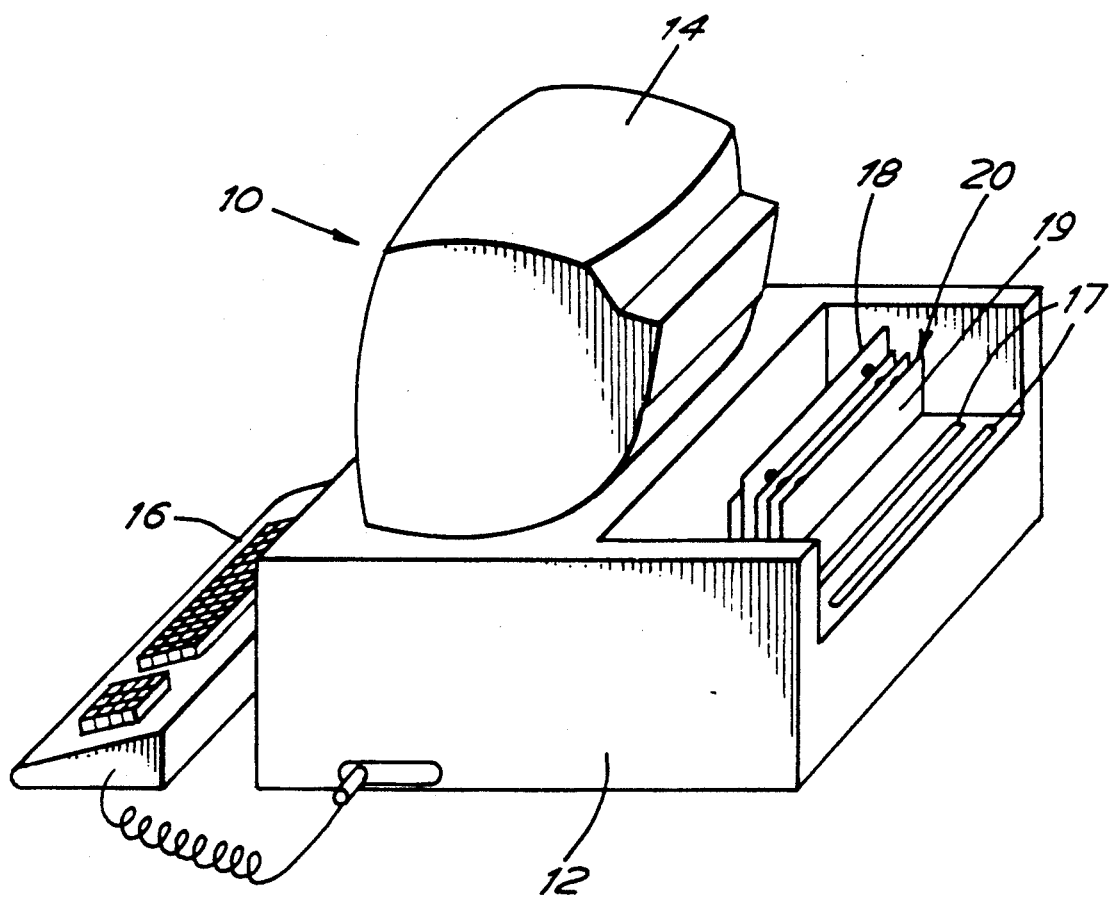
FIG. 1 is a perspective view showing a PC carrying a video adaptor.

Referring to FIG. 1, a conventional computer 10 includes a computer system unit 12, a high resolution computer display monitor 14 and a keyboard 16. The system unit 12 includes expansion slots 17 into which add-on boards for the computer 10 may be plugged.

A video/graphics adapter 20 is plugged into one of the expansion slots 17 to allow the computer 10 to operate as a computer based video/graphics display system. The adapter 20 includes a base board 18, and one or more daughter boards 19 carried by the base board 18. The base board 18 is formed with a plug portion (not shown) to plug in to an expansion slot 17.

Figure 2:
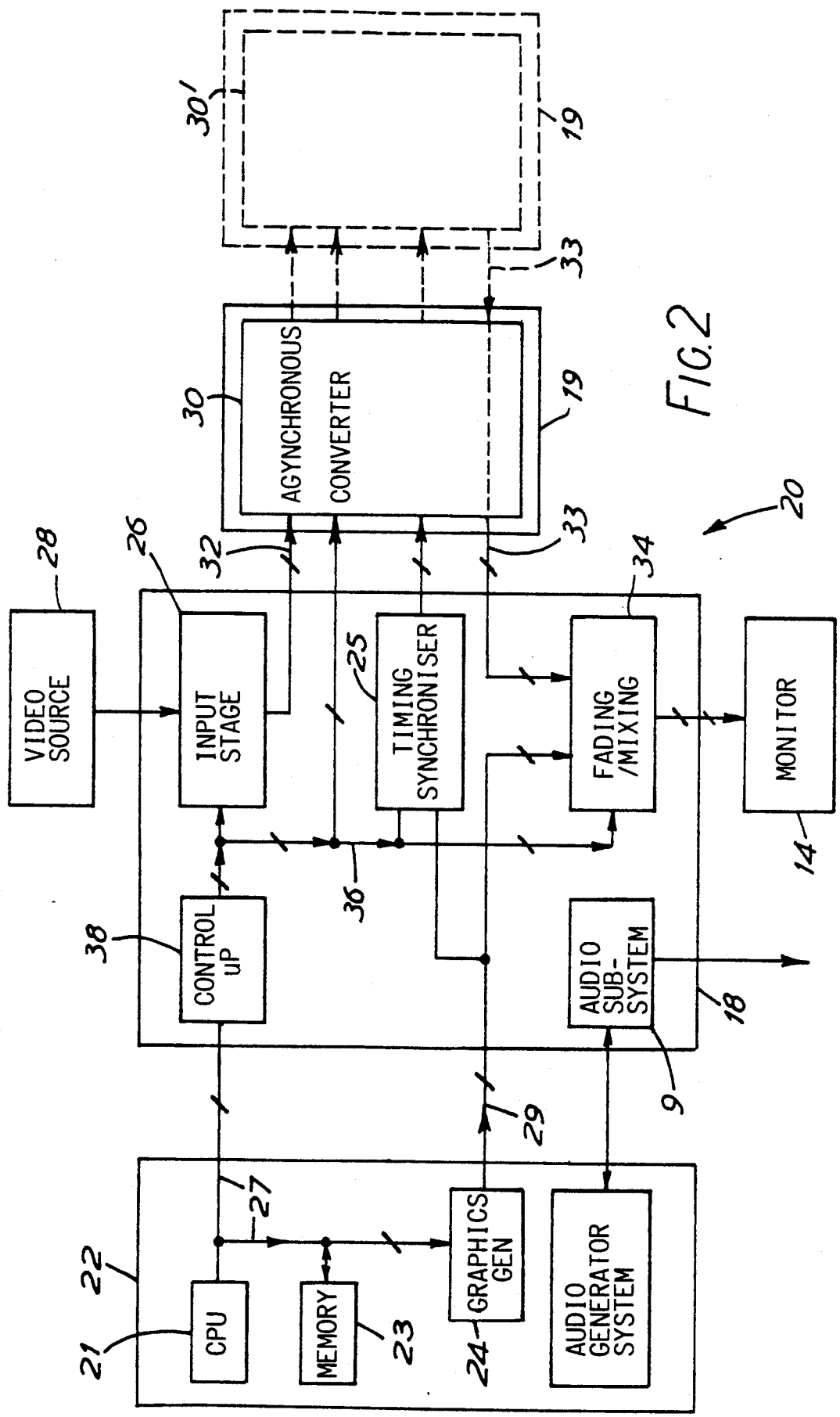
FIG. 2 is a block diagram showing the computer based video/graphic display system.

Referring to FIG. 2, the computer includes a system motherboard 22 carrying memory 23, a central processor 21, and a computer graphics generator 24. The central processor 21 communicates with the memory 23 and the graphics generator 24 by means of a system bus 27. The graphics generator 24 generates graphics signals to be used in the adapter 20. The graphics signals are supplied to the base board 18 by means of a graphics extension bus 29, which also supplies associated graphics timing, synchronisation and vertical blanking data of the graphics signal. The system board 22 also includes a computer audio system 8, including a sound generator and a loudspeaker.

The base board 18 includes a video input stage 26 connected to a video source 28 such as a video disk player. The video input stage contains circuitry for converting the video signal from the video source 28 into a digitally formatted video signal. The output from the input stage 26 is passed by means of a digital video bus 32 to the daughter board(s) 19. Each daughter board contains an asynchronous video converter 30 for storing and converting the video signals into signals synchronised to the graphics generator 24. The base board carries a timing synchroniser 25 connected to the graphics timing bus 29. The output from the timing synchroniser is connected to the asynchronous converter 30 to supply the correct timing signals to the asynchronous converter 30 to synchronise the output to the graphics generator 24. The output from each asynchronous converter 30 is fed to a display bus 33 which returns to the base board 18, and is coupled to a video input of a fading/mixing circuit 34. The graphics extension bus 29 is also connected to another input of the fading/mixing circuit 34. The fading/mixing circuit 34 combines the video and graphics signals on a pixel by pixel basis. The circuit 34 can select for each pixel position, full graphics, full video, or multiplicative ratio mixing of graphics and video.

The output from the fading/mixing circuit 34 is the combined display signal and this is fed to the computer's high resolution display monitor 14. The base board 18 also includes a control microprocessor 38 that directly controls each of the different parts of the video/graphics adapter 20 by means of a microprocessor control bus 36. The control microprocessor 38 is itself programmed by commands from the computer's central processor 21, sent on the system bus 27.

The different parts of the video/graphics will now be described in more detail.

The video input stage 26 is based on a conventional chip set for decoding color composite video signals to YUV signals. Such a chip is, for example, the Philips SAA9050 digital color decoder.

Figure 3:
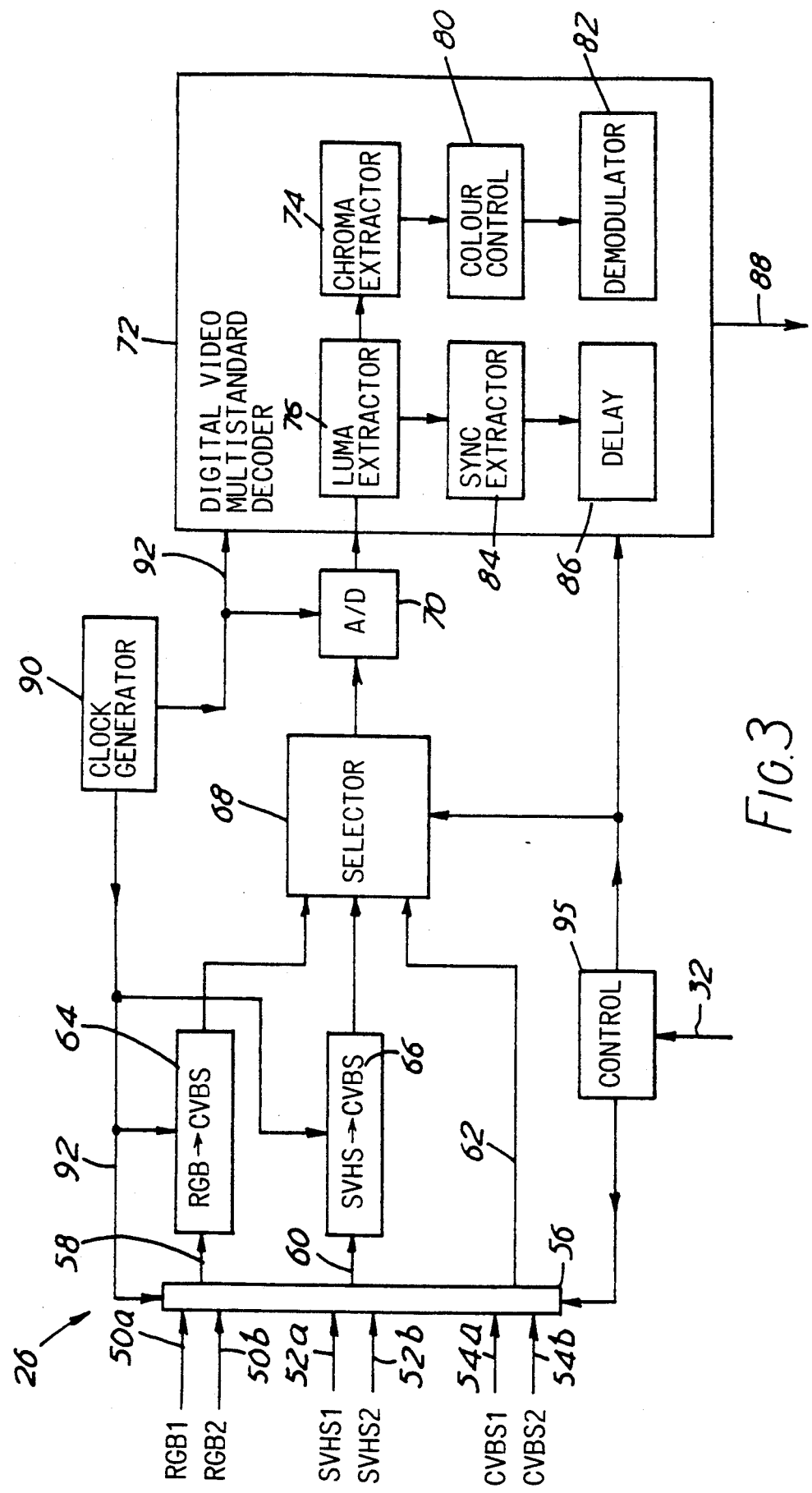
FIG. 3 is a block diagram showing a video input stage of FIG. 2.

The video input stage has inputs for accepting video signals in RGB format, composite (PAL or NTSC) format, or SVHS format. SVHS signals are similar to composite signals, but have separate chroma and luma/sync signals. Referring to FIG. 3, the video input stage 26 has six analogue video input channels, arranged in pairs as two RGB inputs 50a, 50b, two SVHS inputs 52a, 52b, and two composite (i.e. composite video, blanking and sync, CVBS) inputs 54a, 54b. The SVHS inputs 52 and the CVBS inputs 54 can support both PAL and NTSC video standards. The input channels are fed to an input selector matrix 56 that can select any one input channel and route it to a respective RGB input line 58, SVHS input line 60, or CVBS input line 62.

The RGB input line 58 is coupled to an input of an RGB to CVBS converter 64. The converter 64 may be a conventional RGB to NTSC composite video encoder, based on, for example, a Sony CXA1145H video encoder chip. The SVHS input line 60 is coupled to the input of an SVHS to CVBS converter 66 that combines the separate phase encoded chroma and sync/luma signals into a composite CVBS signal.

The outputs from the RGB to CVBS converter 64, and from the SVHS to CVBS converter 66 and the CVBS input line 62 are fed to respective inputs of a three way selector 68. The output from the selector 68 is fed to a conventional high speed video A/D converter 70 which converts analogue CVBS signals to digital form.

The output from the A/D converter 70 is fed to the digital video input of the digital multistandard color decoder 72. The color decoder 72 includes a chroma extractor 74 and a luma extractor 76 for separating the luma and chroma information in the CVBS signal. The chroma extractor 74 comprises a bandpass filter set to a centre frequency that depends on the format of the CVBS signal. For PAL the centre frequency is 4.43 MHz and for NTSC the centre frequency is 3.58 MHz. These frequencies correspond to the chroma sub-carrier frequency of the CVBS signal. The chroma data then passes through an automatic color control stage 80 and then to a quadrature demodulator 82 which can be selected to decode either PAL or NTSC encoded signals. The hue is controlled for NTSC by changing the phase of the quadrature demodulator 82. The luma extractor 76 comprises a chroma trap filter that rejects the centre frequency of bandpass filter chroma extractor 74. The luma signal is fed through a sync extractor 84 that removes the sync signal from the luma. The luminance then passes through a delay circuit 86, to match the delay in the chroma quadrature demodulator. The decoded separate digital luma and chroma signals appear at the output 88. The luma and chroma signals are multiplexed in a ratio of 4:1:1, the data rate for the luma being 13.5 MHz, and the data rate for the chroma being 3.375 MHz. Thus each sample of chroma information is associated with four samples of luma data. The chroma U and V information is multiplexed on a single 4-bit digital channel, and the luma Y information is a 7-bit signal.

Synchronisation between the different parts of the video input stage 26 is achieved by using a clock generator 90 that supplies clock and timing signals via a clock/timing bus 92. The input selector matrix 56, the three way selector 68 and the digital color decoder 72 are controlled by signals from a video input controller 95, under the control of the microprocessor bus 36.

Figure 4:
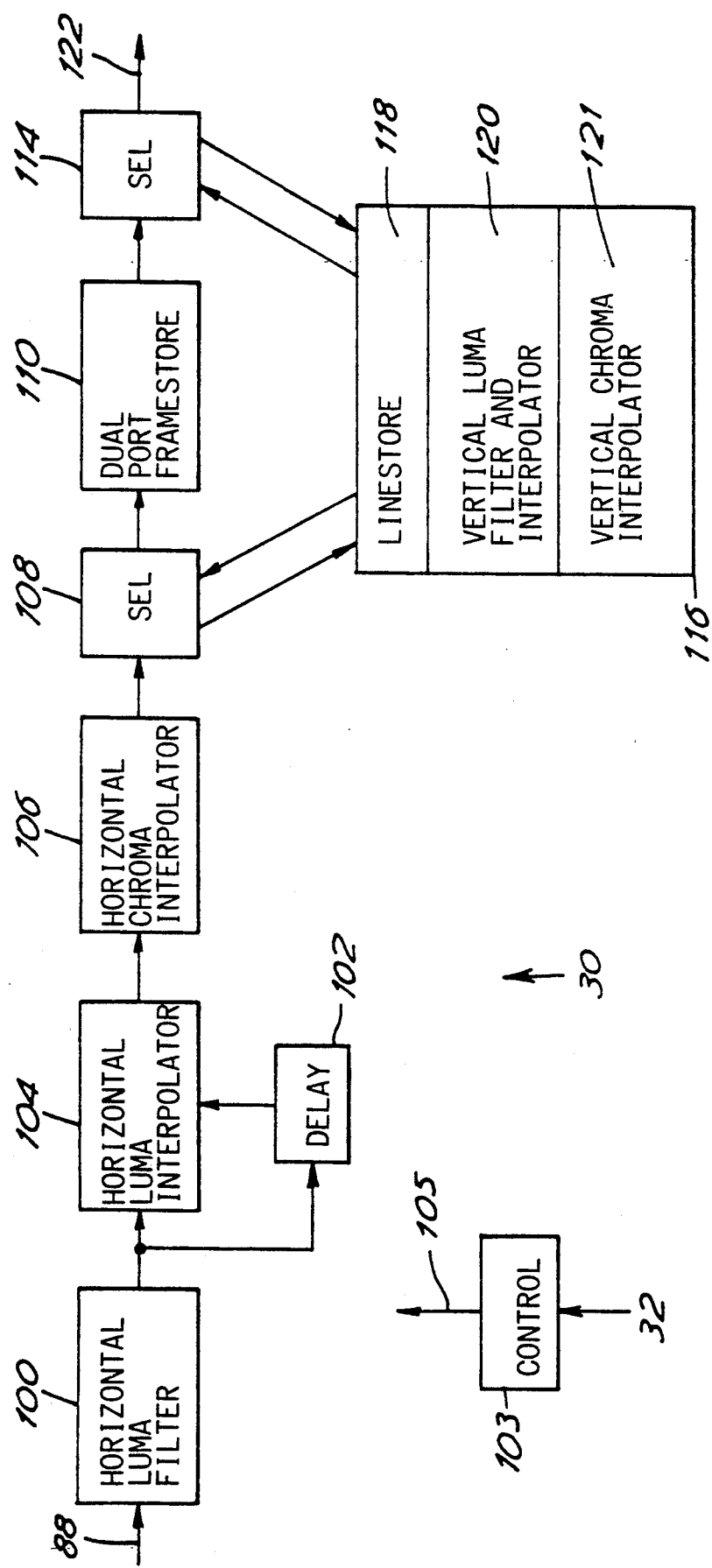
FIG. 4 is a block diagram showing the asynchronous converter of FIG. 2.

The digital output from the video input stage 26 is fed via the video bus 32 to the input of the asynchronous video signal converter 30. Referring to FIG. 4, the asynchronous video converter 30 includes horizontal and vertical, filters and interpolators for processing the input chroma and luma data streams.

The digital input 88 is fed to a horizontal luma filter 100 comprising a set of finite impulse response filters. The particular set of filters used at any instant determines the overall bandwidth of the video input. The five filter combinations configurable in the horizontal luma filter 100 are shown in FIG. 8. The first combination A does not impose any filtering in the video signal, allowing the full video bandwidth to pass. The other filter combinations effect narrower bandwidth filtering, the narrowest band pass filter being with combination E.

The output from the filter 100 is fed to a direct input of a horizontal luma interpolator 104, and through a delay circuit 102 to a delayed input of the interpolator 104. The delay 102 introduces a predetermined delay, such that the luma sample signal sent through the delay 102 arrives at the interpolator 104 together with a subsequent luma sample sent directly to the interpolator 104. The interpolator 104 can perform horizontal scaling of the luma signal by sub-sampling at a predetermined clock rate. Horizontal scaling allows the video to be displayed in a reduced size window of the graphics screen. When sub-sampling, the interpolator selects either the current luma sample value, or an average of the current sample and the previous sample (sent via the delay 102), depending on the time dependent phase of the sub-sample clock pulse relative to the video input sample at that instant of time. If the clock pulse is nearly in phase with the luma input sample, the current luma sample value is selected, otherwise the average value is selected. When sub-sampling, the horizontal filter 100 reduces the bandwidth of the input luma data stream from the 13.5 MHz input rate, so that aliasing caused by the sub-sampling is reduced. Referring to FIGS. 8 and 9, the particular configuration of the filter 100 is dependent on the degree of horizontal scaling, the narrowest band pass filter combination E being selected for the smallest video picture size.

Referring again to FIG. 4, the converter 30 also includes a horizontal chroma interpolator 106. Processing of the horizontal chroma data stream to effect horizontal scaling is complicated by the 4:1:1 rate multiplexing of the luma and chroma signals, which means that each chroma sample has four luma samples associated with it. The chroma interpolator 106 uses a simple "nearest neighbor" selection algorithm to effect horizontal chroma scaling, because the multiplexed chroma signal is not in a suitable form for computational processing. Significant logic would be required to demultiplex, process and remultiplex the chroma information. Since the input sample rate of the chroma data stream is only 3.375 MHz (a quarter of that of the luma input rate), no horizontal filtering of chroma information is necessary, aliasing not being a problem.

Once the video data streams have been processed horizontally, they are then processed vertically and stored in a dual port framestore 110 for asynchronous conversion. The vertical processing is performed either before or after the data stream is stored in the framestore, depending on the degree of vertical scaling required. Vertical scaling is required because the video source has either 240 lines (NTSC) or 288 line (PAL) of active video per field. Using a full computer display screen, the video image has to be displayed in 350, 400 or 480 scan lines of the 31.5 MHz output display, depending on the computer graphics mode in use. If a windowed screen is used, i.e. the video is displayed in a reduced size window of the computer graphics screen, more vertical scaling is required.

The output from the horizontal chroma interpolator 106 is fed to a first selector matrix 108. The selector 108 has an output connected to the dual port framestore 110. The selector 108 also has input/output lines connected to a vertical scaler 116. The output from the dual port framestore 110 is fed to a second selector matrix 114, similar to the first selector 108, and having an output line 122, and input/output lines connected to the vertical scaler 116. In use, if the number of computer monitor display lines for the video image is less than the number of video input lines, the video signal is routed through the first selector 108 to the vertical scaler, and then returned through the first selector 108 to the dual port framestore 110. The output from the framestore 110 is fed directly through the second selector 114 to the output 122. If the number of display lines is equal to or is greater than the number of video input lines, the video signal is fed directly through the first selector 108 to the dual port framestore 110. The output from the framestore 110 is fed thorough the second selector 114 to the vertical scaler 116, and returned through the second selector 114 to the output 122.

The vertical scaler 116 includes a line store 118, a vertical luma filter and interpolator 120 and a vertical chroma interpolator 121. The linestore 118 is of sufficient capacity to hold a full width line of video data. If the video data has been horizontally scaled, more than one video line may be stored in the linestore. For example, if the video is horizontally scaled to half its original width, two video lines may be stored in the line store 118. The vertical scaler has two modes of operation, depending on the degree of vertical scaling required.

When the number of video input lines is greater than the number of display lines, the vertical scaler 116 sub-samples the input lines. Each video input line is stored in the linestore 118. Vertical filtering and interpolation is performed using a subsequent video line. If the video image is being reduced in size in proportion, i.e. maintaining its aspect ratio, two or more video lines may be stored in the linestore 118. This enables more extensive interpolation to be effected by using more vertical samples. The vertical interpolator sub-samples video input lines in a similar manner to the horizontal sub-sampling of the horizontal luma interpolator 104. The output from the interpolator can be either the current vertical sample, or an average of the current and previous (i.e. from the linestore 118) vertical samples. The vertical filter is similar to the horizontal luma filter 100, comprising a set of finite inpulse response filters to reduce the bandwidth of the vertical samples, and hence reduce the effects of aliasing. The two filter combinations that can be configured for vertical filtering are equivalent to the combinations A and B in the horizontal filter 100. FIG. 10 shows the filter combinations used depending on the degree of vertical scaling. The vertical filtering does not have to be as extensive as the horizontal filtering. The vertical chroma interpolator is similar to the horizontal chroma interpolator 104, and uses a simple "nearest neighbor" algorithm for interpolation of the vertical chroma data. As in horizontal chroma processing, no vertical filtering of the vertical chroma samples is necessary.

When the number of display lines is greater than the number of input video lines, the vertical scaler 116 interpolates (over-samples) between the video lines to generate new lines. This is equivalent in operation to "line doubling" in which new lines are generated between all of the video lines, the original and new lines being sub-sampled to obtain an appropriately vertically magnified video signal. The new lines can either duplicate the original lines, or they may be generated by interpolating between two adjacent lines.

Figure 6:
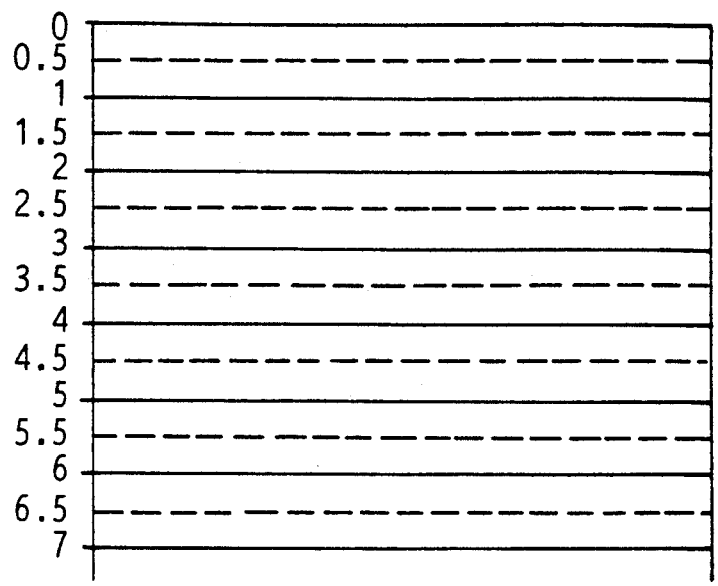
FIGS. 6 and 7 are diagrams illustrating line doubling in the asynchronous converter of FIG. 4.
Figure 7:
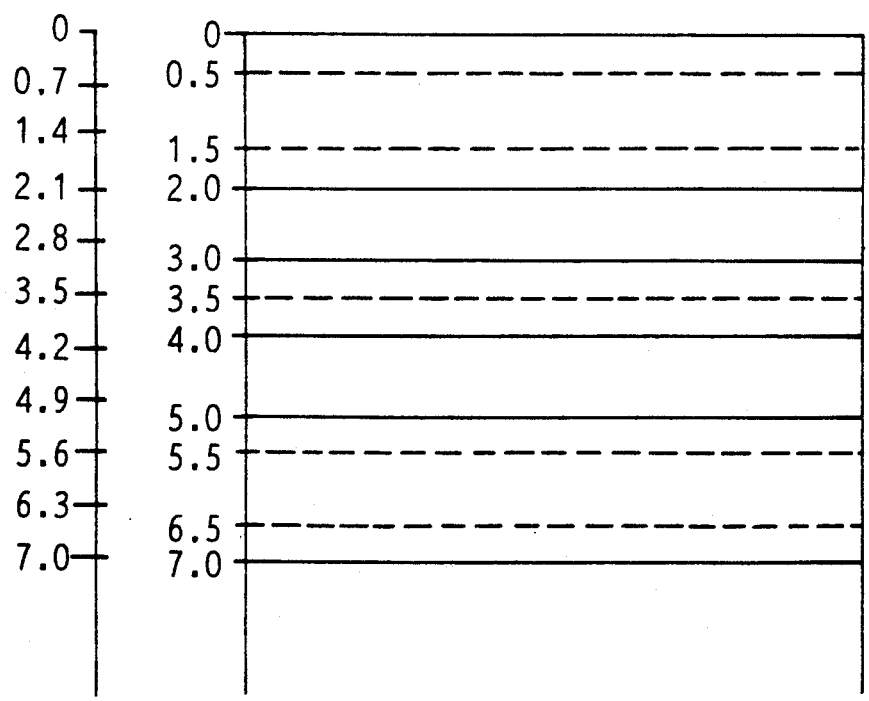

An example of line doubling is illustrated in FIGS. 6 and 7. Say that the input video signal is in NTSC format having 240 lines of active video per field. Say that the computer graphics display is in a 480 line mode, and that it is desired to display the video image in a window set to 71% of the full screen size. Therefore, the number of display lines in the video window is 71%×480=340 full lines. This is more than the number of video input lines, and so line doubling is effected. The scaling factor applied by the vertical scaler is 340/240 lines=1.4. Thus the input image needs to be magnified by a factor of 1.4 to fit the display window.

Referring to FIGS. 6 and 7, the video input lines are shown diagrammatically as horizontal lines 130, and these are labelled 0, 1, 2, etc. These input lines are stored in the framestore 110, and are fed to the vertical scaler 116. The vertical scaler 116 generates new lines shown diagrammatically as dotted lines 132, between the original lines 130. The new lines are labelled 0.5, 1.5, 2.5, etc. The new lines may be duplicates of the original lines 130, e.g. the line 0.5 duplicating the line 0, the line 1.5 duplicating the line 1, etc. The new lines may alternatively be averages of the adjacent original lines, e.g. the new line 0.5 being the average of lines 0 and 1, the line 1.5 being the average of the lines 1 and 2, etc. The number of lines now present is double the number of original input video lines, i.e. 2×240=480. As explained above, a scaling factor of 1.4 is required, and so the vertical scaler 116 sub-samples the doubled lines 130 and 132 to obtain the 340 required lines from the 480 doubled lines. The sub-samples are taken at interval numbers of 1/1.4=0.7, i.e. 0, 0.7, 1.4, 2.1, 2.8, 3.5, 4.2, 4.9, 5.6, 6.3, 7.0 etc. When sub-sampling, the nearest new line 132 or original line 130 is selected, the selected lines therefore being 0, 0.5, 1.5, 2.0, 3.0, 3.5, 4.0, 5.0, 5.5, 6.5, 7.0, etc. The remaining lines are discarded. This gives the correct number of lines for the display. The method of line-doubling and discarding unwanted lines does not waste video information in the display, as the new lines are merely copies of the original lines. For the purposes of illustration of the effect of the vertical scaling, this example has been described in terms of steps of line doubling, and sub-sampling. It will be appreciated that the vertical scaling is performed sequentially on the video lines by interpolation (over-sampling) as the lines are read out from the framestore 110, thereby providing a continuous data stream of video lines.

Figure 11:
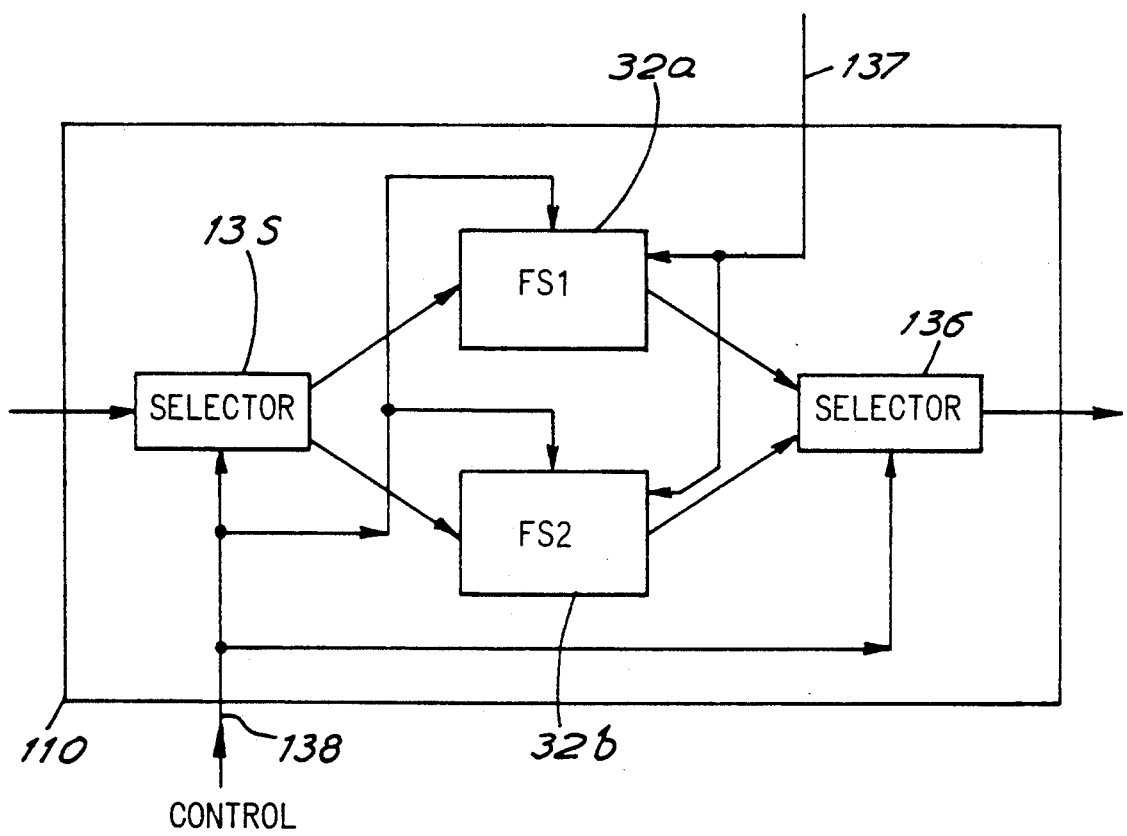
FIG. 11 is a block diagram showing a framestore in the asynchronous converter of FIG. 4.

Referring to FIG. 11, the dual port framestore 110 includes two dual port fieldstores 32a and 32b, a fieldstore input selector 135 connected to select which fieldstore 32 the input data stream is sent to, and an output fieldstore selector 136 connected to select from which fieldstore 32a, 32b the output data stream is supplied. The selectors 135 and 136 are controlled to connect the framestore input and output to different fieldstores. When the framestore input is connected to fieldstore 32a, the framestore output is connected to fieldstore 32b, and vica versa. The input fieldstore selector can be controlled to feed complete fields of video alternately to the fieldstores 32a, 32b. This ensures that when video is being input into one of the framestores, there is always a complete field of video available for display in the other fieldstore. With an interlaced video input signal, even fields may thus be stored in one fieldstore 32a, and odd fields in the other fieldstore 32b.

Figure 5:
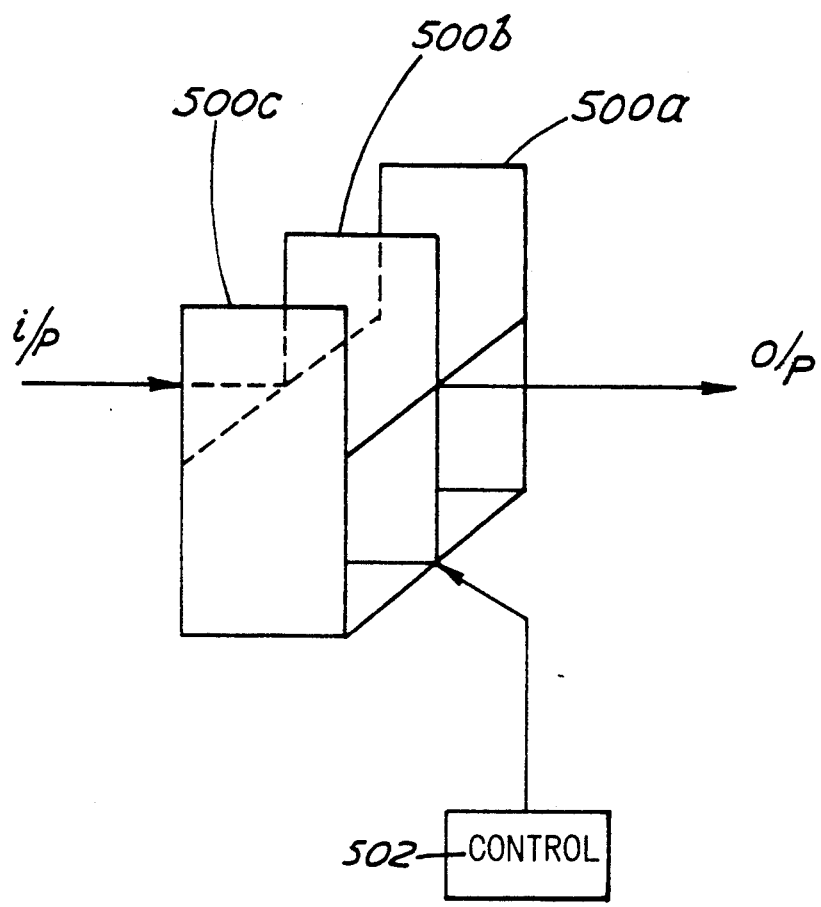
FIG. 5 is a block diagram showing the fieldstore in the asynchronous converter of FIG. 4.

Referring to FIG. 5, each fieldstore 32a, 32b is made up from three FIFO shift registers 500a, 500b, 500c. Each shift register has a capacity of 256 K×4. A suitable FIFO chip device for each shift register is a Texas TMS4C1050-3. By using shift registers for the fieldstore instead of RAM, the cost and physical size of each fieldstore can be kept small. Control logic 502 is provided to step through the output from the shift registers, to provide a degree of random access to data in the registers.

The framestore input is fed in at a rate determined by the horizontal and vertical scalers that sub-sample the video signal, as described hereinbefore. The framestore has a clock input line 137 that is connected to the clock inputs of the fieldstore outputs, to control the rate at which video data is read out from the fieldstores. As described hereinafter, the clock is a 24/27 MHz signal synchronised to the computer graphics generator 24. This achieves asynchronous conversion of the video input signal to a signal synchronised to the computer graphics generator. The selectors 135, 136 and the framestores 32a, 32b are controlled by means of a control bus 138 from the main controller 38. The digital output from the converter 30 is in the form of a 7-bit luma signal at the line doubled rate of 27 MHz and 4:1.1 multiplexed signed 7-bit color difference chroma signals at the rate of 6.75 MHz.

Figure 12:
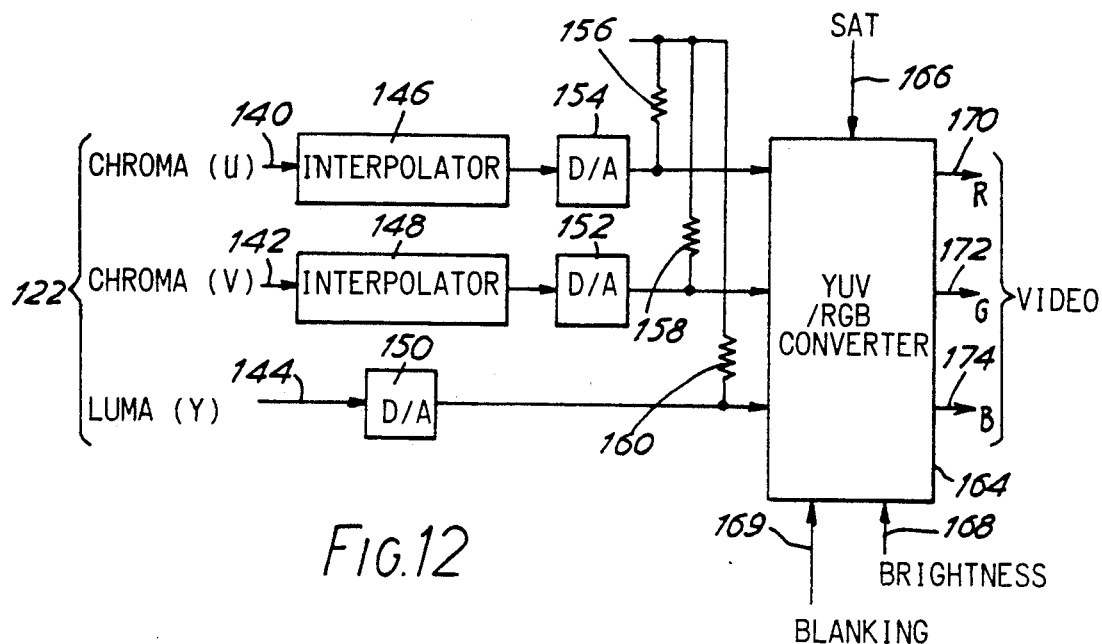
FIG. 12 is a block diagram showing the YUV input to the fading/mixing matrix of FIG. 2.
Figure 14:
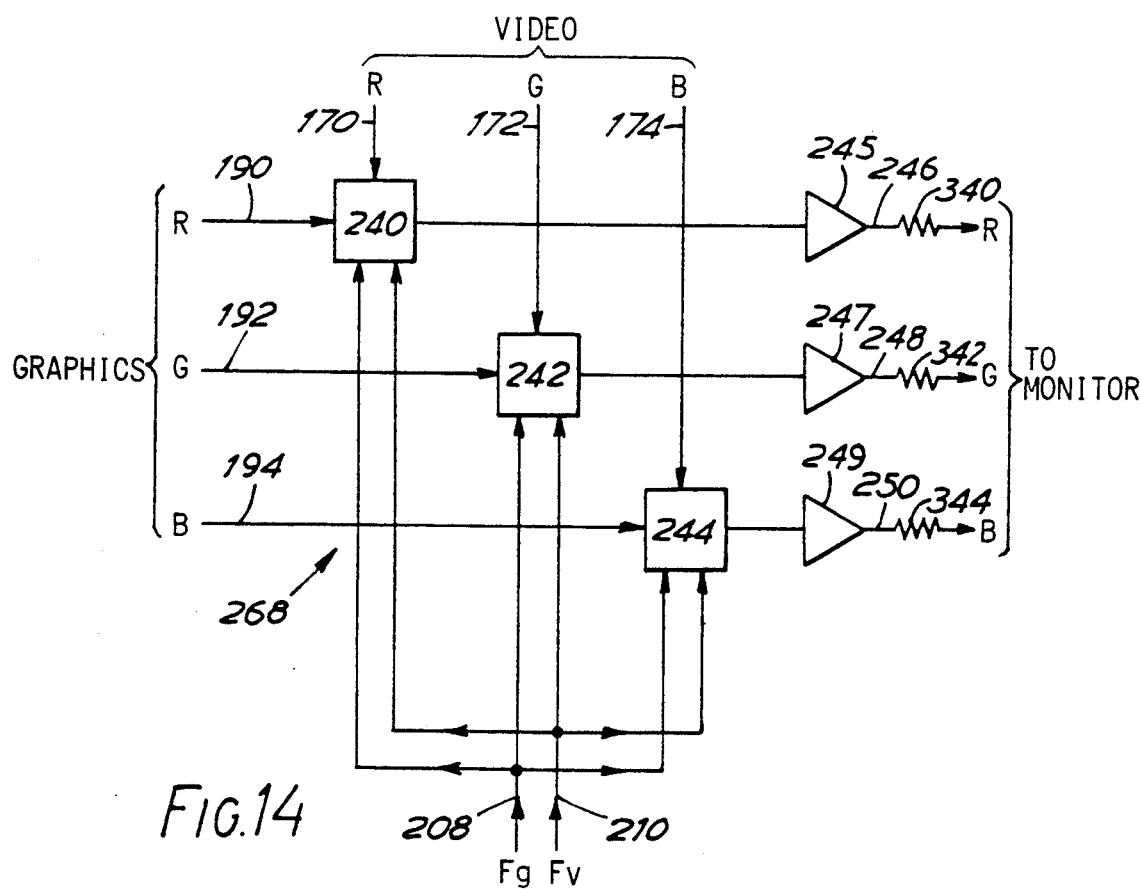
FIG. 14 is a block diagram showing the output stage of the fading/mixing matrix of FIG. 2.

Referring to FIGS. 12, 13 and 14, the digital output is passed to input lines of the fading/mixing circuit 34, which combines the video signals with the computer graphics signals. The luma signal is fed through a luma Y input 144 to a luma D/A converter 150 that produces a luma signal current output. A suitable chip device for the D/A converter 150 is the Philips video chip SAA9060 D/A converter. The chip has dedicated control inputs (not shown) that enable a resolution improvement filter contained in the chip, to improve quantisation noise behavior in areas with small variation and to increase the input data width to 8-bits before D/A conversion.

The chroma data is supplied to chroma U and V input lines 140, 142, respectively, and fed to chroma interpolators 146, 148, respectively. The interpolators oversample the input chroma signals to increase the chroma data rate to 27 MHz, the same rate as the luma data. The outputs from the chroma interpolators 146, 148 are fed to chroma D/A converters 154, 152, respectively, that produce chroma signal current outputs. The chroma D/A converters 154, 152 are similar to the luma D/A converter, and may use the same D/A converter chip device, e.g. the Phillips SAA9060.

The output from the luma D/A converter 150 is connected through a first load resistor 160 to a voltage reference 162. The load resistor 160 converts the output current from the D/A converter 150 to a voltage signal. The outputs from the chroma D/A converters 154, 152 are similarly connected through second and third load resistors, 156, 158 respectively, to the reference 162. The second and third load resistors 156, 158 convert the chroma output current signals to corresponding voltage signals.

Figure 16:
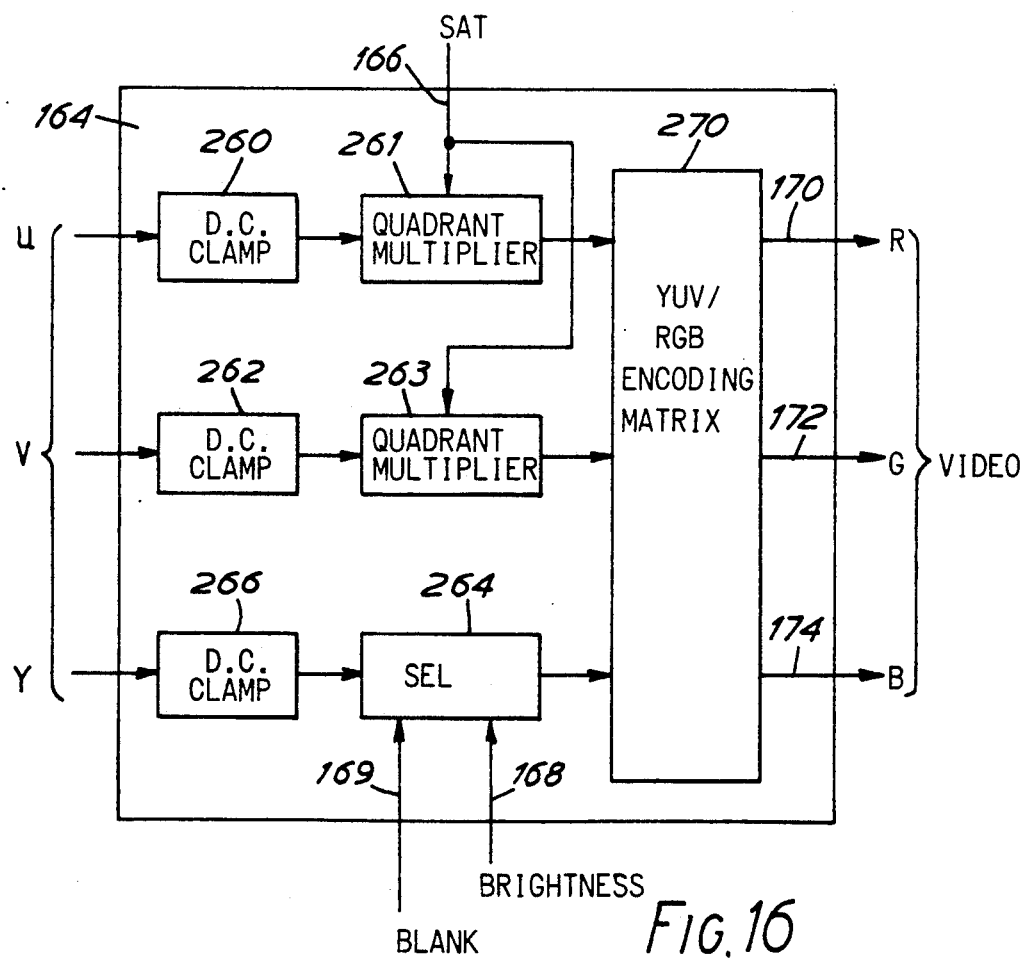
FIG. 16 is a block diagram showing a detail of FIG. 12.

The luma and chroma analogue voltage signals are A.C. coupled to a YUV/RGB converter 164. Referring to FIG. 16, the U chroma input to the YUV/RGB converter 164 is fed to a first D.C. clamp circuit 260. The V chroma input is fed to a second D.C. clamp circuit 262, similar to the first clamp circuit 260. The D.C. clamp circuits 260, 262 restore the correct D.C. voltage levels to the chroma signals. The chroma output from the first D.C. clamp 260 is fed to a first quadrant multiplier 261, and the chroma output from the second D.C. clamp 262 is fed to a second quadrant multiplier 263. An analogue color saturation control voltage is supplied to the first and second quadrant multipliers 261, 263 by means of a saturation control line 166. The gain of the multipliers 261, 263 is controlled by the saturation control voltage, the larger the output from the multipliers the larger the chroma color difference signals, and hence the greater the color saturation in the video signal.

The luma input to the YUV/RGB converter 164 is connected to a third D.C. clamp circuit 226 that restores the correct D.C. voltage to the luma signal. The output from the photo D.C. clamp circuit 72 is fed through a brightness selector 264 that can add an analogue brightness voltage offset to the luma signal. The brightness offset voltage is supplied through a brightness control line 168, as is described hereinafter. The selector 264 has a control input fed from the blanking line of the synchroniser 25, as described hereinafter. During the blanking interval of the input luma signal, the brightness offset is turned off by the selector 264 to allow D.C. clamps that are in the monitor 14 to be correctly set.

The luma output from the selector 264, and the gain adjusted chroma outputs from the first and second quadrant multipliers 261 and 263 are fed to respective inputs of an analogue YUV/RGB encoding matrix 270. The encoding matrix has YUV input lines and RGB output lines and performs the following conventional video matrix operations:

$$-(G-Y) = 0.51[-(R-Y)] - 0.19[-(B-Y)]$$

and $$R = -[-(R-Y) - Y]$$

$$G = -[-(G-Y) - Y]$$

$$B = -[-(B-Y) - Y]$$

where $-(R-Y) = U$ and $-(B-Y) = V$.

The RGB video signal matrix output lines 170, 172 and 174, respectively, are fed to respective video inputs of a fading matrix 268, described hereinafter, where they are faded and combined with computer graphics signals.

The computer graphics signals are encoded in RGB format within the computer graphics generator 24. However, the video/graphics system 20 functionally duplicates the RGB encoder within the computer graphics generator 24 so that it can process the computer graphics signals. By way of explanation, within the computer graphics generator 24, the computer graphics are sent to the RGB encoder as digital logical colors. Each logical color has a physical (i.e. real) color assigned to it, for example, the logical color 1, may be red, the logical color 2 may be white, etc. A palette is then used to convert the logical colors into analogue video signals in the three components R, G and B.

In the video/graphics system 20, a conventional graphics palette 176 is used to duplicate the palette of the graphics generator.

Figure 17:
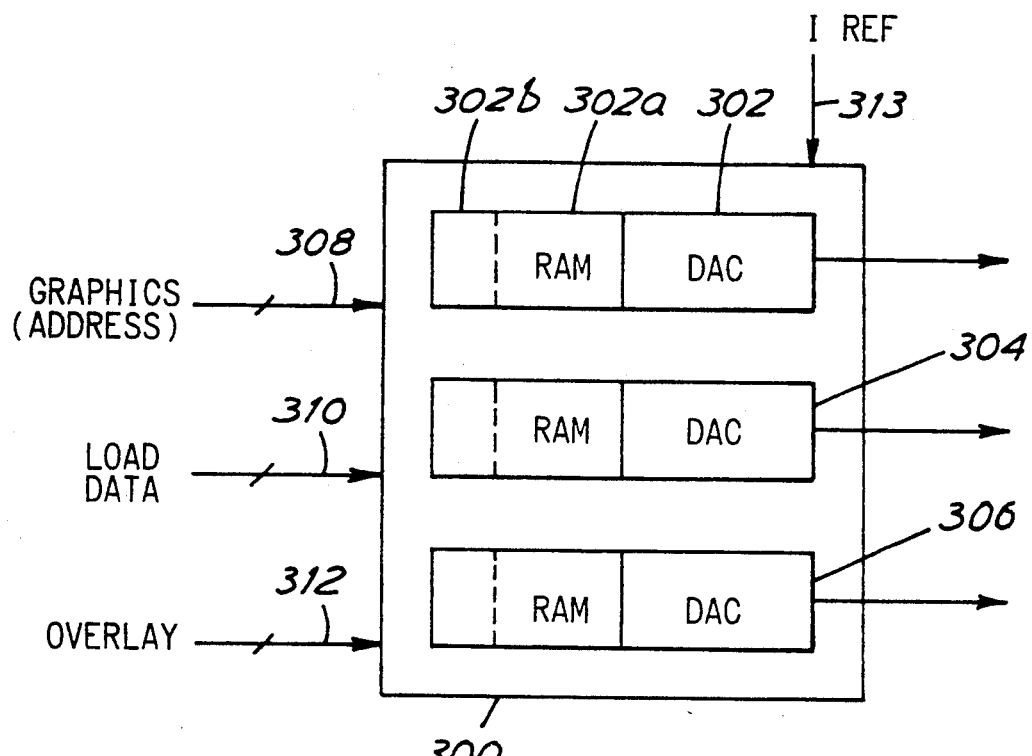
FIG. 17 is a block diagram showing a palette.

Referring to FIG. 17, a conventional palette 300 includes three conventional RAMDACs 302, 304 and 306. Each RAMDAC is an addressable device, the output of which is fed to a D/A converter to obtain an analogue output signal. A conventional palette is a standard Bt471 chip, which contains three 6-bit resolution D/A converters, and three main RAMs of 256×6-bit words. Another palette is the Bt478 chip, which contains three 8-bit resolution D/A converters, and three main RAMs of 256×8-bit words. For graphics use, each address in the RAMs corresponds to a logical color, and the RAMs contain the separate RGB component signal values of the physical colors assigned to the logical colors. The graphics logical colors are inputted through a common address input bus 308. The RAMs' contents can be updated by means of a load data input bus 310.

The palette 300 also includes an overlay palette, stored in an overlay section of the RAMs. For the RAMDAC 302, the RAM is partitioned into a main RAM 302a, and an overlay RAM 302b. Fifteen overlay palettes are available, and these can be selected by means of a four bit overlay input bus 312. When an overlay palette is selected, the outputs from the RAMDACs are set to predetermined values stored in the overlay palette, regardless of any addresses being selected through the address bus 308. When all of the input lines in the overlay input bus 312 are set to zero, the normal palette in the main RAM is in operation.

The palette also has a reference current input 313, used by the D/A convertors in the RAMDACs. The outputs from the RAMDACs are in the form of analogue current signals, dependent on the reference current. The reference current may be obtained by coupling the reference input through a reference resistor, to a reference voltage line.

Referring to FIG. 13, the graphics palette 176 is set up for normal palette use, the overlay palette being disabled by setting the overlay input 314 to zero.

The palette 176 is programmed with the same RGB palette values for the logical colors as the palette in the computer graphics generator 24. The palette 176 is connected to the system bus 27 of the computer system 22 by means of an input bus 186, so that the graphics palette 176 is updated whenever new palette data is written by the computer 22 to the palette in the graphics generator 24. The palette in the graphics generator 24 may also be disabled by a control command from the computer system 22. The graphics palette 176 is then also disabled from updating the RGB logical color values until the palette in the graphics generator 24 is re-enabled. This allows several alternative palettes to be installed in the computer 22. The computer system 22 cannot read data from the graphics palette 176. This is not necessary, as the palette in the graphics generator 24 contains the same palette data, and this may be read by the computer 22.

The logical color pixel data of the graphics display is inputted to the address input of the graphics palette 176 through an 8-bit graphics input bus 188, which is connected to the graphics extension bus 29. The logical color values are supplied for each pixel, line by line, to the palette 176, and the palette 176 outputs the appropriate analogue RGB color signals for the logical colors. The analogue outputs appear on RGB graphics output lines 190, 192, 194, respectively, which are fed to respective graphics inputs of the fading matrix 268, as described hereinafter.

The fading/mixing system also includes a control palette 195, containing three control RAMDACs. The control palette is preferably identical to the graphic palette 176, so as to match the rise and fall delay times of the palette 176. The control palette may also be connected to the same voltage reference that supplies the reference current for the graphics palette 300. The control palette 195 contains three RAMDACs for controlling the fading and mixing of the graphics and video signals at each pixel position on the display monitor, as well as the saturation of the video signal at each pixel position.

The first RAMDAC in the control palette 195 contains saturation data for the video signals at each pixel position, and has an analogue saturation output 166, connected to the YUV/RGB converter, as described hereinbefore. The second RAMDAC in the control palette 195 contains fading data for the graphics signals at each pixel position, and has an analogue Fg output 208. The third RAMDAC on the control palette 195 contains fading data for the video signals at each pixel position, and has an analogue Fv output 210. The fader outputs, Fg 208 and Fv 210, are fed to respective fader inputs of the fading matrix 268, as described hereinafter. For full graphics, no video, display at any pixel position, the Fg signal is set to MAX (i.e. its maximum current output value), and the Fv signal is set to zero. Similarly for full video, no graphics, display at any pixel position, the Fg signal is set to zero, and the Fv signal is set to MAX. Intermediate values of Fv and Fg cause fading and/or mixing of the graphics and video signals at the pixel position.

The address input to the control palette 195 is fed from the computer graphics input bus 188, although only the 6 least six significant bits of the 8-bit bus 188 are connected to the address input of the control palette 195. The remaining 2-bits of the bus 188 are connected to the overlay input of the palette 195, as described hereinafter. The logical colors supplied by the graphics generator 24 therefore refer both to physical graphics colors, as generated by the graphics palette 176, and to saturation, video fading and graphics fading combinations, as generated by the control palette 195. As will be described hereinafter, logical colors having values in the range 64 to 255 address overlay palettes in the control palette 195, and so only 64 logical colors in the range 0 to 63 can be used for fully programmable control of graphics colors and fading, and video saturation and fading. However, this is perfectly adequate for most applications.

Figure 18:
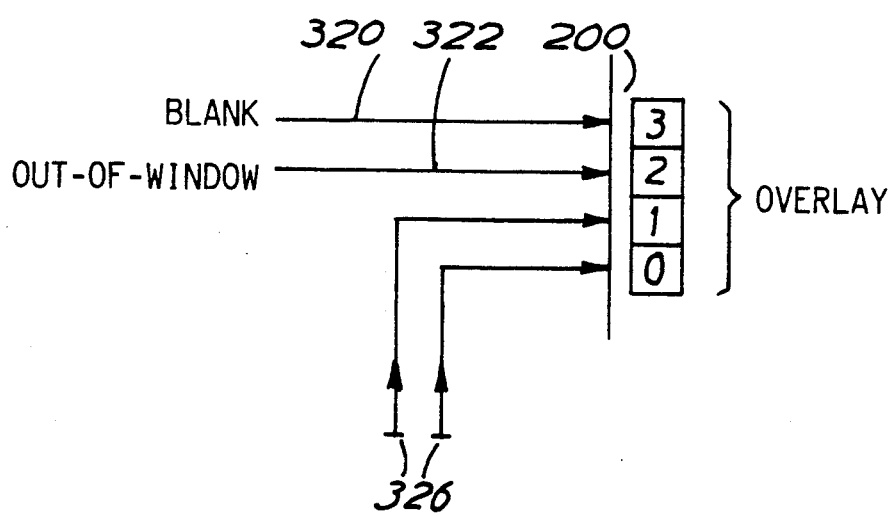
FIG. 18 is a diagram illustrating the inputs to the overlay palettes of the palette of FIG. 17.

Referring to FIGS. 13 and 18, the overlay input bus 200 comprises four input lines, labelled 0, 1, 2, 3, therefore allowing access to 15 overlay palettes. Only 5 overlay palettes are required by the fading/mixing circuit 34, and so a simple, highly redundant arrangement for addressing the overlay palette is used.

One overlay input line 320 is fed from a timing bus 187 connected to the graphics extension bus 29. The timing bus 187 includes a BLANK line this is active during the vertical blanking interval of the computer graphics. The BLANK line is coupled to the overlay input line 320. During the vertical blanking interval of the computer graphics, the input line 320 is active, and enables an overlay palette that forces the Fg and Fv signals to zero, i.e. the combined output display signal contains no video or graphics. During the vertical blanking interval, new control palette data can be read into the control palette 195 from the control microprocessor bus 36. The use of only 64 addresses in the control palette allows new tables to be loaded into the palette very rapidly. The ability to load a completely new control palette table during each vertical blanking interval allows effects such as time-varying fading of the screen display to be achieved. For example, referring to FIG. 19, say that a display 350 consists of a video window 352 comprising full video signals and no graphics signals, except for a graphics character T, and surrounded by a graphics display 354 comprising full graphics signals and no video signals. Then at an arbitrary pixel position 356 inside the video window 352, the fade values will be Fv=MAX and Fg=0. Where the graphics character appears at a pixel position 357, the fade values will be Fv=0, Fg=MAX. Similarly, at any arbitrary pixel position 358 outside the video window, the fade values will be, say Fv=0 and Fg=MAX. As will be described hereinafter, the fade values outside the video window do not matter because these are automatically set by the fading/mixing circuit 34. FIG. 29 shows the Fv and Fg values along a horizontal line 355 through the display.

Say that it is desired to fade the video window, gradually with time, into the graphics display. Referring to FIG. 20, this can be done by reloading new values for Fv and Fg into the control palette 195 during the vertical blanking interval between subsequent display frames. The new data for the control palette 195 is loaded at intervals T, the frame display time. Eventually, the Fv values in the palette will reach zero, and the Fg values in the palette will reach MAX. When this happens, the display window will have been completed faded into the graphics display, there being no video signals displayed. FIG. 30 shows the new Fg and Fv values along the line 355. The fading rate will be determined by the number of sets of new palette data that are loaded, and on whether new data is loaded into the palette on every vertical blanking interval, or whether the new data is loaded on, for example, every tenth vertical blanking interval.

Referring again to FIGS. 13 and 18, a second overlay input line 322 is connected to an "Out-Of-Window" signal line that is supplied by an In-Window generator 211, described hereinafter. The area on the display in which video signals are displayed is referred to as the video window. The purpose of the In-Window generator 211 is to generate a signal indicative of whether the current pixel position is inside or outside the video window. If the Out-Of-Window signal is active, the control palette 195 enables an overlay palette that forces the Fv signal to zero and the Fg signal to MAX. Thus the fading/mixing circuit 34 cannot attempt to display a video signal when the pixel position is outside the video-window, regardless of the logical color attributes at that pixel position. The third overlay input line 324 is connected to one of the two most significant lines in the graphics address bus 188. The fourth overlay input line 326 is connected to the other of the two most significant lines. Thus logical graphics colors in the range 64 to 255 will enable overlay palettes rather than allow pixel-by-pixel control of the saturation and fading levels.

Referring to FIG. 13, the In-Window Generator 211 is contained in a custom hardware chip, built from logic gates. The Generator 211 contains an interface 214 that is coupled to the microprocessor control bus 36, an In-Rectangle generator 218, an In-Window Routing Controller 220, and a memory controller 216. The memory controller accesses a 1 MBit FIFO RAM 224. The Generator 211 also includes a Sync and Timing Generator 212, which is fed from the timing bus 187. As explained hereinbefore, the In-Window Generator generates for each pixel position on the screen, a signal indicative of whether the pixel is inside or outside the video window. The In-Window calculation cannot be performed by a simple rectangle calculation on the screen co-ordinates, since the video window may be overlapped in arbitrary ways by other windows, and the adapter 20 may allow multiple video windows which may themselves overlap.

A bit-plane containing the in-window information for each pixel is built up in the RAM 224. A logical 1 bit in the bit-plane corresponds to the pixel position being inside the video window. The in-window data is read out sequentially from the RAM 224, at the same rate as the graphics pixel logical color information is supplied from the graphics generator 24. The BLANK signal in the timing bus 187 is used to synchronise the beginning of the In-Window bit-plane to the first graphics pixel position. The RAM 224 contains two In-Window bit-planes, one being used for display while the other is built up. The size of each bit plane is 640 *pixels*×480 *lines*=307 *kbits*. Thus the two bit-planes are easily stored in the 1 MBit RAM, which is double-buffered to allow independent access to the bit-planes. The memory controller 216 controls access to the bit-planes in the RAM 224, and the In-Window Routing Control 220 selects which bit-plane is used as the active bit-plane, and which bit-plane is to be built-up. The sync and Timing Generator 212 synchronises and controls the rate at which the In-Window data is read-out to the Control Palette 195. A new bit-plane is built up each time the video window layout is altered. To build up a new bit plane, the contents of the bit plane are cleaned, and new video window rectangle data for each asynchronous converter 30 is supplied by the control processor 36. For each set of rectangle data, the contents of the bit-plane are read out sequentially from the FIFO RAM 224, and, for each bit, if the bit is within the video window rectangle, the in-window generator sets the bit to a logical 1. If the bit is not within the video window, the bit value is no altered. The bit is then recycled into the FIFO bit plane. Thus overlapping windows will be correctly built up in the bit-plane, even if the resulting video window is not rectangular.

Time taken to build up a new rectangle in the bit plane is the same time as for a display field.

The fading/mixing circuit 34 also includes a brightness D/A converter 228 which generates the analogue brightness control signal on the brightness control line 168, referred to hereinbefore. The brightness D/A converter 228 is controlled from the microprocessor control bus 36. The brightness control signal introduces a brightness offset into the luma signal in the YUV/RGB converter 168, thereby increasing the brightness of the video signal to compensate for the normally bright graphics signals that are produced by the computer system.

Referring to FIG. 14, the video/graphics fading matrix 268 has RGB graphics inputs 190, 192, 194, respectively, and RGB video inputs 170, 172, 174 respectively. The R video input 170 and the R graphics input 190 are coupled to respective input of a first two-quadrant multiplier 240. The G video input 172 and the G graphics input 192 are coupled to respective inputs of a second two-quadrant multiplier 242. The B video input 174 and the B graphics input 194 are coupled to respective inputs of a third two-quadrant multiplier 242. The Fg and Fv fader line inputs 208, 210 respectively, from the control palette 195 are supplied to respect inputs of each of the two-quadrant multipliers 244.

Figure 15:
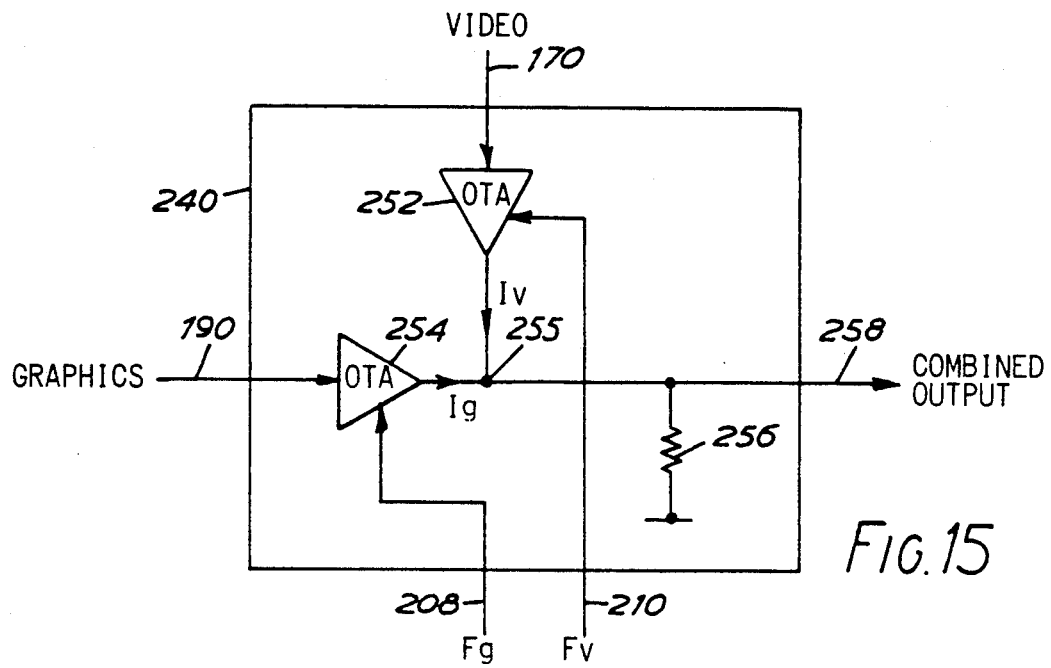
FIG. 15 is a circuit diagram showing a detail of FIG. 14.

FIG. 15 shows in more detail the first two-quadrant multiplier 240. The second and third multipliers 242, 244 respectively, are identical to the first multiplier 240. Referring to FIG. 15, the multiplier 240 contains a video operational transconductance amplifier 252 fed from the video input 170. The Fv video fade signal line 210 is coupled to a gain control input of the amplifier 252. For a fade value of Fv=MAX, the gain of the amplifier 252 is two. The multiplier 240 also contains a graphics operational transconductance amplifier 254, similar to the video operational transconductance amplifier 252, fed from the graphics input 190. The Fg graphics fade signal line 208 is coupled to a gain control input of the amplifier 254. The output from the video amplifier 252 is a current Iv, and the output from the graphics amplifier 254 is a current Ig. The currents Iv and Ig are summed at a node 255 and passed through a load resistance 256. The output from the two-quadrant multiplier 240 is a combined voltage signal line 258, providing an output voltage equivalent to the sum of the fade adjusted R graphics and fade adjusted R video signals. If the Fv signal is zero, the Iv output is zero and the combined output voltage is thus merely the graphics input signal. Similarly, if the Fg signal is zero, the Ig output is zero, and the combined output voltage is merely the video input signal. Intermediate values of Fg and Fv provide multiplicative ratio mixing of the R video and R graphics signals.

The second and third two-quadrant multipliers, 242, 244, respectively, operate in the same manner as the first two-quadrant multiplier 240, to provide combined G and combined B signals.

The output from the first two-quadrant multiplier 240 is fed through a buffer amplifier 245 to drive an R display output line 246. The output line 246 is driven via a 75 Ohm resistor 340 and fed to the R input of the computer monitor 14. Similarly the output from the second two-quadrant multiplier 242 is fed through a buffer amplifier 247 to drive a G display output line 248. The output line 248 is driven via a 75 Ohm resistor 342, and fed to the G input of the computer monitor 14. The output from the third two-quadrant multiplier 244 is fed through a buffer amplifier 249 to drive a B display output line 250. The output line 250 is driven via a 75 Ohm resistor 344, and fed to the B input of the computer monitor 14. The video inputs to the monitor are conventionally terminated 75 Ohm resistors (not shown) inside the monitor 14.

Figure 21:
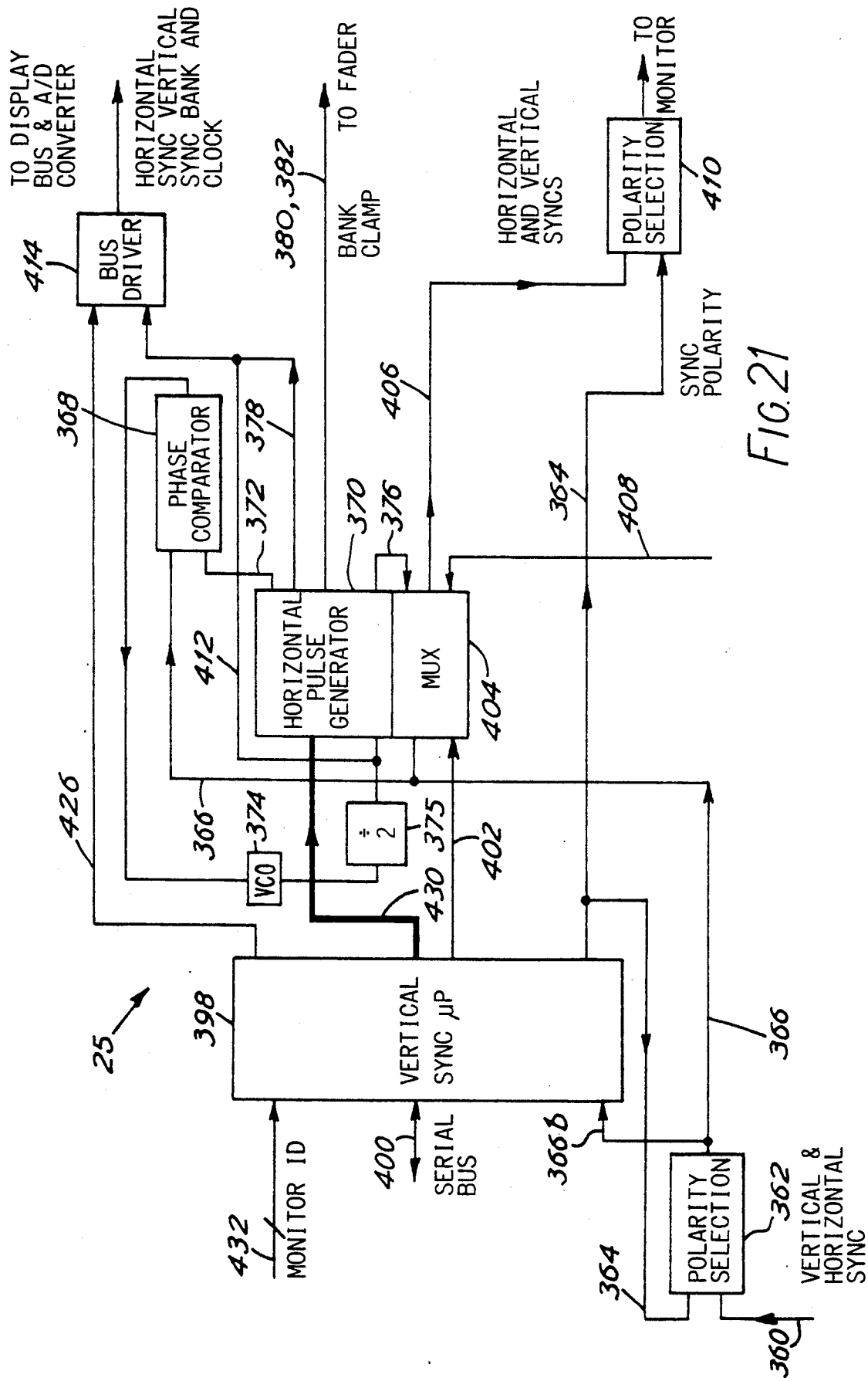
FIG. 21 is a block diagram showing the synchroniser timer of FIG. 2.
Figure 22:
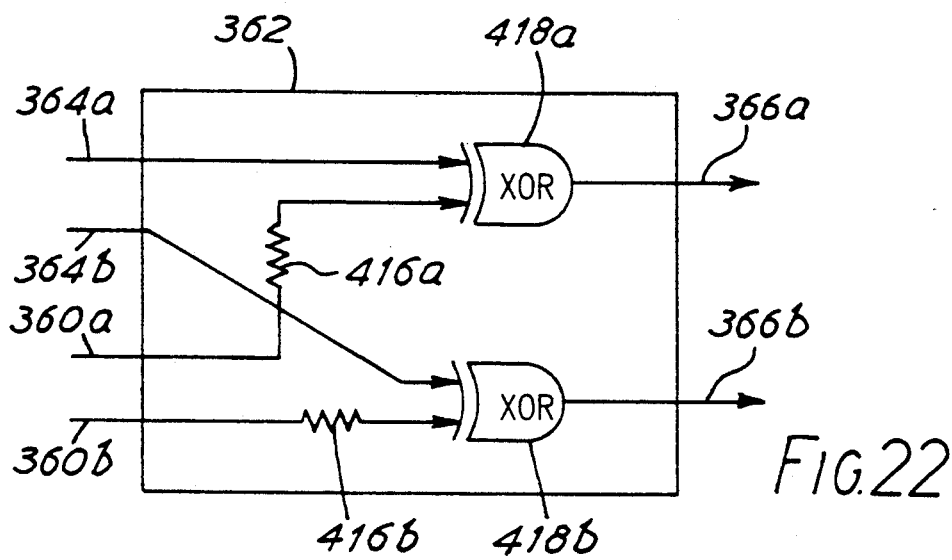
FIGS. 22 and 23 are circuit diagrams showing the sync polarity inverters of FIG. 21.

Referring to FIG. 21, the timing synchroniser 25 has a 2 line input sync bus 360 connected to the video extension bus 29. The input sync bus 360 feeds separate horizontal and vertical sync pulses on lines 360a, 360b respectively from the computer graphics generator 24 into the synchroniser 25. The input sync bus 360 passes through an input polarity selector 362. This is required because the sync pulses from the graphics generator 24 can be of either positive or negative polarity, depending on the number of visible lines on the display. The polarity of the sync signals is used to control the line spacing of the monitor 14 for 480 or 400 line modes. The polarity selector 362 can selectively invert the sync signals to form a positive polarity, under the control of a polarity control bus 364. Referring to FIG. 22, the horizontal and vertical graphics sync inputs 360a and 360b, respectively, are fed via resistors 416a, 416b respectively to inputs of exclusive-OR gates 418a, 418b respectively. The resistor 41b suppress ringing on the inputs 360. The polarity control bus 364 has horizontal and vertical control lines 364a, 364b respectively, and these are coupled to the other inputs of the exclusive-OR gates 418a, 418b, respectively. The exclusive-OR gates 418a, 418b have respective output lines 366a, 366b. When an active signal is applied by the control lines 364a, 364b, the exclusive-OR gates 418a, 418b invert the incoming horizontal and vertical sync signals, thereby inverting the sync polarity. The control lines 366 are fed from a vertical sync microprocessor 398 described hereinafter. This is, in turn, set up by the system CPU 21.

Referring to FIG. 21, the graphics horizontal sync output 366a from the selector 362 is fed to one input of a phase comparator 368 based on a conventional HC 4046A chip. A horizontal pulse generator (HPG) 370, described in more detail herein after, has a first output 372 connected to the other input of the phase comparator 368. The phase comparator 368 has an output which feeds to an input of a voltage controlled oscillator (VCO) 374. The output from the VCO 374 is fed back to clock input of the HPG 370, through a clock rate prescaler 375. The HPG 370, the phase comparator 368 and the VCO 374 thus form a conventional phase locked loop. The VCO may be a conventional Colpitt's oscillator, based on a single transistor design with a tuned circuit for feedback. The VCO 374 runs at approximately 40 to 65 MHz which when divided by the prescaler 375 give a clock rate in the region of 20 to 32 MHz. This range ensure that, despite tolerance variations, the required video clock frequency of 24 to 27 MHz can be met. The prescaler 375 divides the output from the VCO 374 by two, and provides an output signal having an equal mark/space ratio. This signal is fed by a video clock line 412 to the display bus 33, and to the video clock inputs of the D/A converters 154, 152, 150 (FIG. 12). The HPG has five other outputs. The second output 376 provides a horizontal sync output for the display bus 33. The fourth output 380 provides a vertical blank signal for the YUV/RGB encoding matrix, which controls the selector 264 (FIG. 16) to turn off the brightness offset signal introduced by the brightness control line 168 during vertical blanking. The fifth output 382 provides a clamp signal for the YUV/RGB encoder 164 (FIG. 16), which controls the clamps 260, 262 and 266 to clamp to the video D.C. level during blanking. The sixth output 384 provides a vertical blank signal for the D/A converters 154, 152 and 150 (FIG. 12). When active, the sixth output 384 forces the D/A converter outputs to zero (i.e. no luma, no chroma) so that the signal can be A.C. coupled to the YUV/RGB converter 168, and clamped therein. The sixth output 384 also provides synchronisation for the chroma demultiplexing, and goes to the display bus 33 to enable output from the asynchronous converters 30. The durations and positions of the output signals from the HPG are independently programmable.

Figure 24:
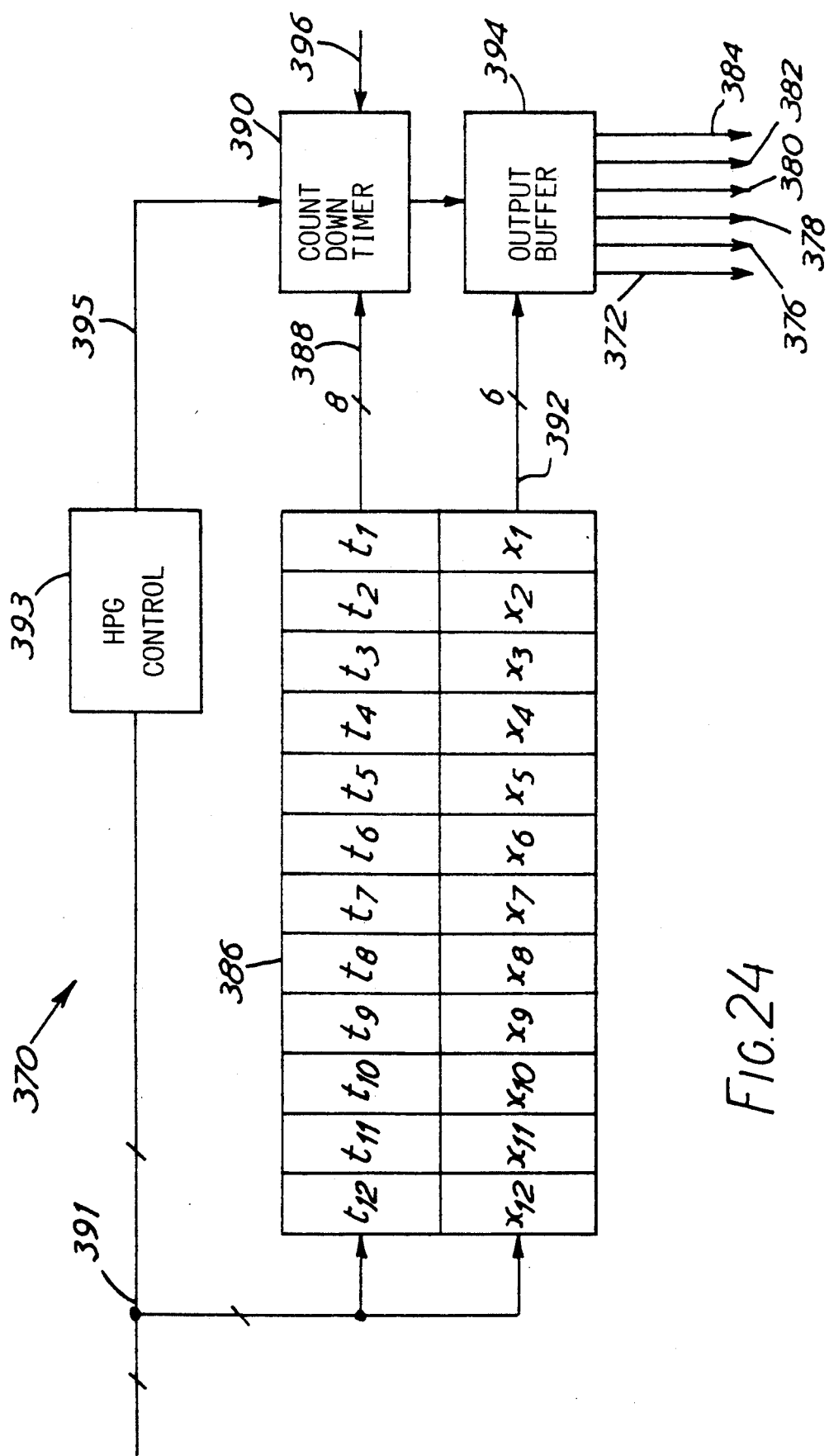
FIG. 24 is a block diagram showing the horizontal pulse generator of the synchroniser timer of FIG. 21.

Referring to FIG. 24, the HPG 370 contains a gate array 386 for storing twelve 8-bit time durations, labelled $t_1 \ldots t_{12}$, and for storing twelve 6-bit output state values, labelled $x_1 \ldots x_{12}$. The time durations are fed sequentially through a duration-bus 388 to an 8-bit count down timer 390. The corresponding output states are fed sequentially through a output-state-bus 392 to a 6-bit output buffer 394. The output lines from the buffer from the six outputs 372, 376, 378, 380, 382 and 384 from the HPG 870. The values stored in the gate array 386 can be updated by means of a block load through an input bus 391. The HPG 370 also includes HPG control logic 393 that controls the operation of the count down timer by means of a control line 395. In operation, a time duration value $t_1$ is loaded from the gate array 386 into the count down timer 390, and a corresponding output state value $x_i$ is loaded simultaneously into the output buffer 394. The count down timer 390 then counts down from the value $t_i$ to zero, on clock pulses fed in through a clock input 396. When the count down timer reaches zero, the next time duration value $t_{i+1}$ and its corresponding output state value $x_{i+1}$ are loaded from the gate array 386 in to the time 390 and the output buffer 394, respectively, and the process is repeated. Once the values $t_{12}$ and $x_{12}$ have been loaded, the HPG 370 recycles to the first values $t_1$ and $x_1$. The HPG 370 can thus produce timing signals with an arbitrary period and phase timing relationship.

Figures 25, 26:
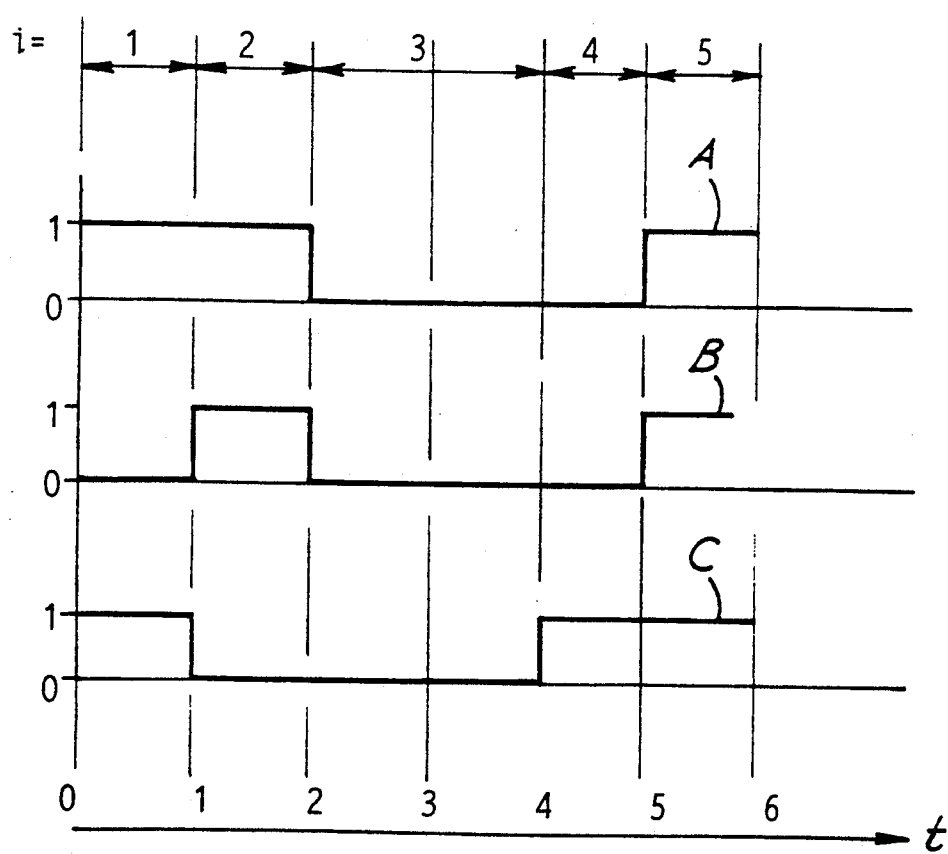
FIGS. 25 and 26 are diagrams illustrating operation of the horizontal pulse generator of FIG. 24.

FIGS. 25 and 26 illustrate operation of the HPG 370, with reference to the three least significant output state lines, 384, 382 and 380, (in order of increasing significance). The output signals A, B and C refer to the signals appearing at the output lines 384, 382 and 380, respectively.

Referring to FIG. 21, the synchroniser 25 also includes a vertical sync microprocessor 398. The microprocessor 398 may, for example, be a mask programmed 80C51 chip device, which is controlled through a serial bus 400 from the control microprocessor 38 (FIG. 2). The vertical sync microprocessor 398 counts display bus horizontal syncs, and when the count exceeds a predetermined modulus value, a vertical sync pulse is generated. The vertical sync pulse appears as an output on a vertical pulse output line 402. The predetermined modulus value depends on the display field rate. The vertical pulse output 402 is fed through a multiplexer 404, where it is associated with the second output 376 from the HPG 370. The multiplexer 404 also has two other inputs, connected to the graphics vertical and horizontal sync outputs 366a, 366b, respectively from the input polarity selector 362. The multiplexer has a monitor sync output bus 406 comprising a horizontal sync line 406a and a vertical sync line 506b. Depending on a control input 408, the multiplexer 404 either routes the graphics horizontal and vertical sync lines 366a, 366b respectively, to the horizontal and vertical monitor sync lines 406a and 406b respectively, or it routes the horizontal pulse line 376 and the vertical pulse line 402 to the horizontal and vertical monitor sync lines 406a, 406b respectively. The control input 408 is connected via a port (not shown) to the computer system 22 (FIG. 2). This allows the computer 22 to bypass the synchroniser 25, and feed the sync signals from its graphics generator 24 directly to the monitor 14. This is normally used when the computer 22 is first switched on, as the video/graphics adapter 20 will not at that time be properly initialised, and so would not itself enable a display to be generated on the monitor 14. Once the computer 22 has properly set up the video/graphics adapter 20, the multiplexer 404 can be switched to use the output horizontal and vertical pulse sync signals from the synchroniser 25.

Figure 23:
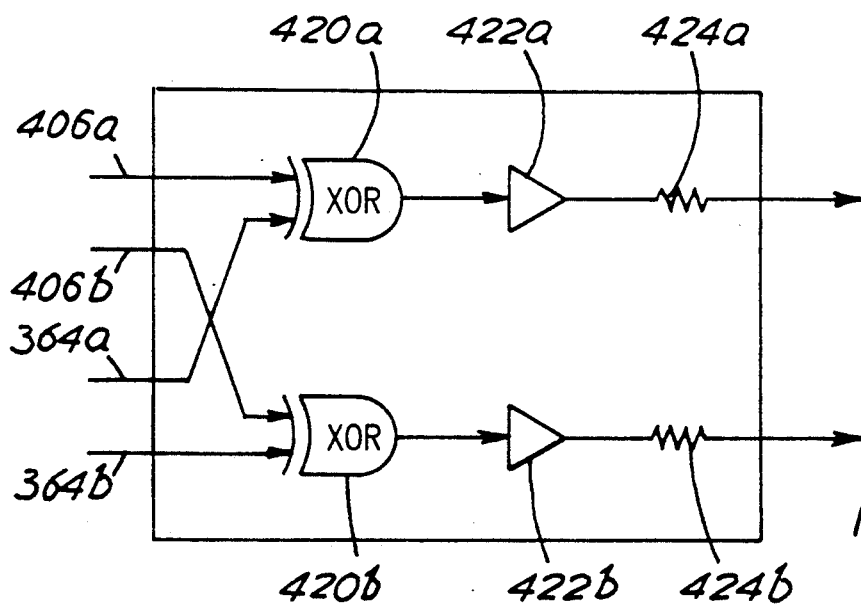

The monitor sync output bus 406 is fed to an output polarity selector 410, similar to the input polarity selector 362. The output polarity selector 410 has a control input coupled to the polarity control bus 364. Referring to FIG. 23, the horizontal and vertical output sync lines 406a, 406b, respectively, are connected to inputs of respective exclusive-OR gates 420a, 420b. The horizontal and vertical control lines 364a and 364b, respectively, are connected to the other inputs of the exclusive-OR gates 420a, 420b. The outputs from the exclusive-OR gates 420a, 420b are connected through respective buffer amplifiers 422a, 422b and output resistors 424a, 424b, respectively to drive the monitor 14. The vertical sync microprocessor 398 also has a graphics vertical sync input fed from the graphics vertical sync line 366b.

The signal lines supplied from the synchroniser 25 to the display bus 33 are buffered by a bus driver buffer 414, controlled by an enable line 426 from the vertical sync processor 398. The outputs from the buffer 414 are tristated, such that when the enable line 426 is inactive, the outputs from the buffer are set to high impedance. This allows several baseboards 18 to be connected together in the adapter 20, for example, for multiple video signal inputs, with only one synchroniser 25 being enabled to supply timing and synchronisation signals to the display bus 33.

In operation, the phase locked loop formed by the HPG 370, the phase comparator 368, the VCO 374 and the prescaler 375, locks on to graphics horizontal sync signals fed in on the sync input bus 360. The timing signals produced by the HPG 370 are therefore synchronised to the incoming graphics sync signals. By altering the relative phases of the different horizontal, and vertical blanking, timing signals the video window can be moved both horizontally and vertically in the display screen relative to the computer graphics. The graphics position may also be finely adjusted, relative to the monitor sync signals.

As explained hereinbefore, the vertical sync processor 398 produces vertical sync signals by counting horizontal sync pulses generated by the HPG 370, and generating a vertical sync pulse whenever the count exceeds a predetermined modulus value. The vertical sync processor 398 also monitors the phase difference between the vertical sync pulses that it produces and the graphics vertical input pulses supplied through the graphics vertical sync line 366b. If the two vertical syncs are not in phase, the vertical sync processor 395 modifies the modulus value to bring the syncs into phase in a controlled manner. The modulus value can be increased or decreased by up to eleven lines from its predetermined value, set by the graphics mode. This has the effect of increasing or decreasing, respectively, the number of lines that occur during the vertical blanking interval of the output vertical sync signal. The two vertical sync signals are thereby brought into phase smoothly, without too great an effect on the display screen.

During graphics mode changes in the graphics generator 24, the vertical and horizontal syncs from the graphics generator 24 are halted until the new graphics mode is set up in the graphics generator 24, and then properly entered. To avoid any significant disruption in the display screen, the synchroniser 25 continues to generate horizontal and vertical sync pulses even though the graphics horizontal and vertical sync pulses to which the generated pulses are normally locked, are absent. Thus although the graphics display from the computer is inhibited, the video window can still be displayed on the monitor 14.

When the new graphics mode is entered, the graphics generator 24 restarts the graphics horizontal and vertical sync signals. However, these signals are restarted with random phase relative to the horizontal and vertical sync pulses generated by the synchroniser 25. The phase locked loop controlling the HPG 370 quickly brings the HPG 370 back into phase lock with the graphics horizontal sync signal. This causes negligible effect on the display screen. The phase difference between the graphics vertical sync signal and the output vertical sync signal is detected by the vertical sync microprocessor 398 and, as explained hereinbefore, the vertical sync microprocessor increases or decreases the number of lines in the vertical blanking portion of the output vertical sync, in order to bring the two vertical sync signals back into phase lock. Thus a stable display screen is maintained during mode changes, the mode change causing negligible visible disruption.

New data is written in to the HPG 370 if required during the graphics mode change. The new values are supplied from the vertical sync microprocessor 398 through a two bit serial data bus 430. The new data is block loaded into the gate array 386 of the HPG 370, the block load causing a momentary glitch in the display screen.

The vertical sync microprocessor 398 also includes a monitor identification input bus 432 connected to the monitor socket. The monitor identification bus 432 returns the monitor identification bits from the monitor socket to the vertical sync processor 398.

Figure 27:
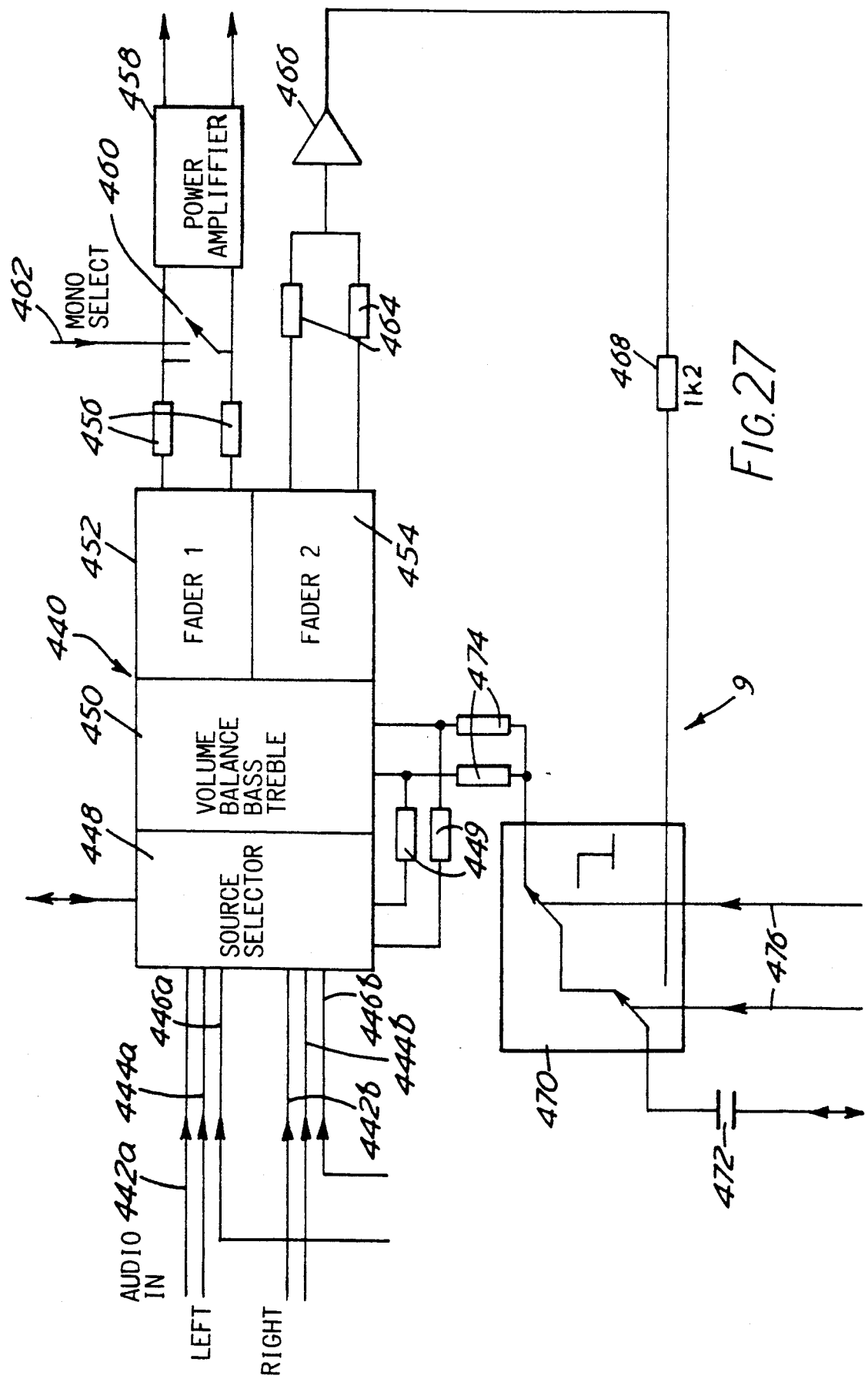
FIG. 27 is a block diagram showing the audio channel of the computer system.

Referring to FIG. 27, the audio sub-system 9 is based on a conventional sound fader control circuit (SOFAC) 440, for example, a TEA6300T sound chip. The audio sub-system 9 includes three pairs of stereo inputs, 442, 444, 446, the left channel inputs being labelled 442a, 444a and 446a, and the right channel inputs being labelled 442b, 444b, 446b, respectively. The first input channel 442 is associated with the first video input, and the second audio input channel 444 is associated with the second video input. The third audio input channel 446 is coupled to the daughter board connector for future expansion.

The audio input channels are fed to respective inputs of a source selector 448 contained within the SOFAC 440. The SOFAC 440 also contains a volume, balance, base, treble control section 450 and two stereo faders 452 and 454 which are independent of the volume control. The stereo output from the source selector 448 is coupled through resistors 449 and passes through the volume, balance, base, treble control section 450, and in parallel to the inputs of the faders 452, 454. The output from the first fader 452, is passed through attenuation resistors 456 and to the inputs of a stereo power amplifier 458. The power amplifier 458 can typically drive 2×75 mW into 32 Ohm stereo headphones. A selector 460 can short circuit the stereo channels to convert the audio signals to mono. The selector 460 is controlled by a mono select control line 462 coupled to the control microprocessor 38. The stereo output from the second fader 454 is fed via two attentuation resistors 464 to a mono input of a mono buffer-amplifier 466. The output from the buffer-amplifier 466 is passed through a 1K2 impedance matching resistor to a pole of a selector matrix 470. Another pole of the selector matrix 470 is connected through a DC coupling capacitor 472 to the audio node of the audio system 8 in the computer 22. The selector matrix 470 has a third pole coupled through resistors 474 to the input of the volume, balance, base and treble control section 450 of the SOFAC 440, where it is mixed with the stereo output from the source selector 448. The selector matrix 470 is controlled by means of two control lines 476 coupled to the control microprocessor 38.

In operation, under the control of the control processor 38, stereo audio input signal from one of the input channels 442, 444, 446, is selected by the source selector 448 and processed by the volume, balance, base, treble control section 450. The stereo audio output from the control section 450 can be fed by the first fader 452 to the stereo amplifier 458 and to a stereo output socket. The output from the control section 450 can also be fed through the second fader 454 to the buffer 466 and to the selector matrix 470. The selector matrix 470 controls whether audio signals are sent from the audio sub-system 9 to the computer audio system 8 or whether audio signals from the computer audio system 8 are fed via the resistors 474 to the input of the SOFAC 440.

Figure 28:
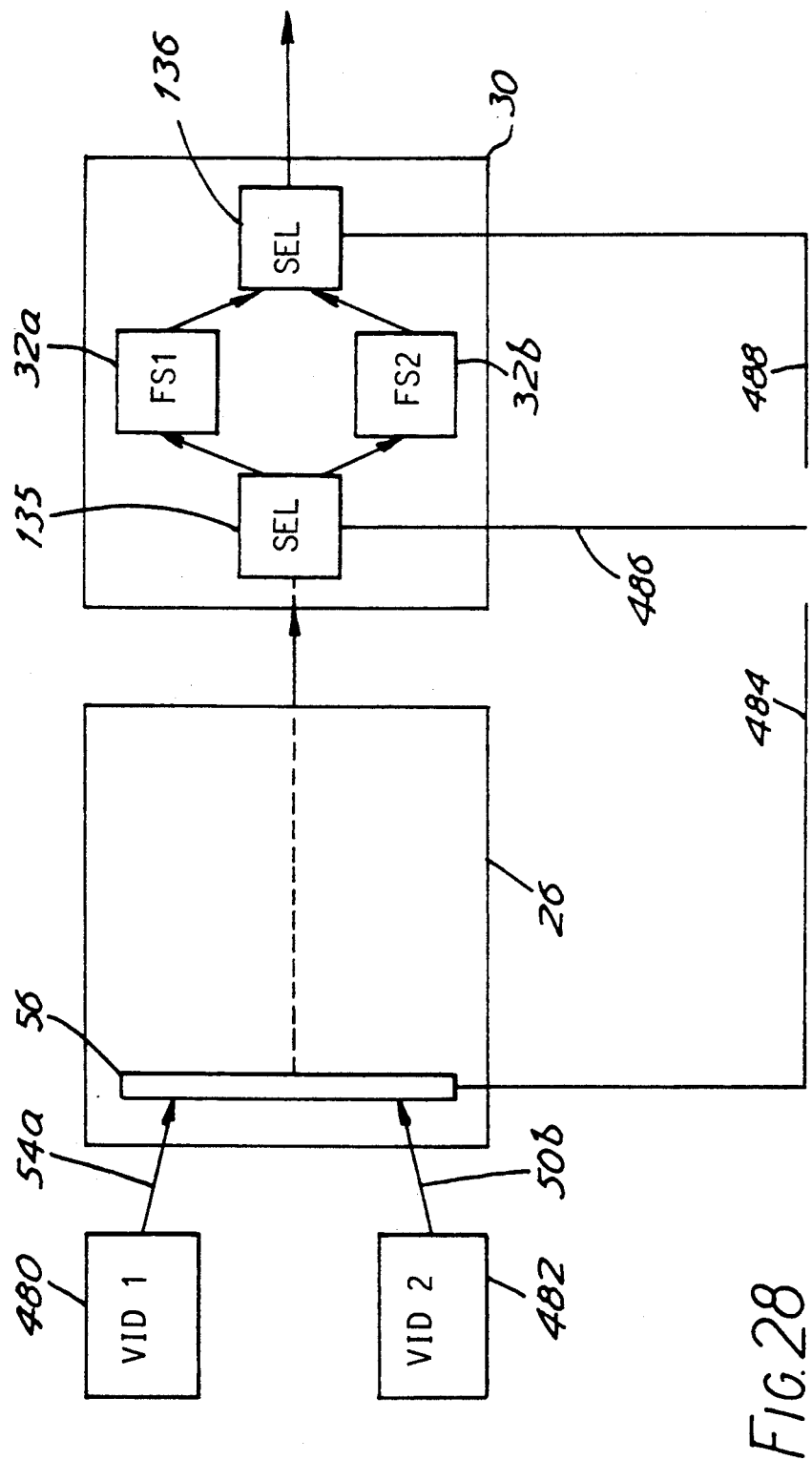
FIG. 28 is a block diagram illustrating real-time input switched mode of operation.

The video/graphics adapter 20 is also operable in a real-time switched input mode, in which video signals from two independent synchronised video sources may be displayed in two independent video windows on the display screen. FIG. 28 shows the parts of the adapter 20 that are switched when operating in the real-time switched input mode. Referring to FIG. 28, a first mode video source 480 is connected to a first video input for example the first and composite video input 54a, and a second video source 482 is connected to a second video input, for example, the second RGB input 50b. The video inputs are fed to the video input selector 56 in the video input stage 26. The selector is controllable by means of a control line 484. For clarity, the remaining parts of the input stage 26 have been omitted.

The output from the video input stage 26 is fed to the asynchronous converter 30. As explained hereinbefore, the input fieldstore selector 135 selects which of the first and second fieldstores 32a, 32b respectively, the video input data is stored. The output fieldstore selector 136 selects from which fieldstore the video data is to be asynchronously read. The input and output fieldstore selectors 135, 136 respectively, are controlled by respective control lines 486 and 488, such that complete video input fields are stored alternately in the fieldstores 32a, 32b and the output is always read from the fieldstore that is not being written into. In the real-time switched input mode, the video input selector 56 is controlled to switch alternately between the first and second video input sources 480, 482 respectively at the same time as the fieldstore input selector 135 is switched once a complete video field has been inputted. Thus, say the video input selector 56 selects the first video source 480, and the input fieldstore selector 135 selects the first fieldstore 32a. A complete video field from the first video source 480 will be stored in the first fieldstore 32a, and at the same time, the contents of the second fieldstore will be outputted for display on the display screen. Once a complete video field has been inputted and stored in the first fieldstore 32a, the video input selector 56, the fieldstore input selector 135 and the fieldstore output selector 136 will all be switched to their opposite sense. A complete video field from the second video source 482 will then be inputted and stored in the second fieldstore 32b, while at the same time the contents of the first fieldstore, i.e. the stored field from the first video source 480, will be displayed on the display screen. Once the complete field from the second video source 482 has been inputted, the selectors 56, 135 and 136 will again switch sense, allowing input from the first video source 480, while the stored video field from the second video source is displayed.

The real-time switching is performed on every complete field of input video data, thereby allowing apparent simultaneous display of two video signals.

We claim:

1. In a system for combining a video image from a video source and a computer graphics image from a computer graphics generator, on a display monitor, an apparatus comprising:
- video signal input means for receiving a video signal from said video source;
- graphics signal input means for receiving a graphics signal from said computer graphics generator;
- asynchronous converter means having a signal input coupled to said video signal input means and a control input coupled to said graphics signal input means, for converting said video signal to a modified video signal synchronised to said graphics signal;
- mixer means coupled to said asynchronous converter and to said graphics input means for producing a combined signal from said modified video signal and said graphics signal; and
- means coupled to said mixer means for feeding said combined signal to said display monitor.

2. In a system for combining a video image from a video source and a computer graphics image from a computer graphics generator, on a display monitor, said system including combining means for producing from two synchronized signals a combined signal for display on said display monitor, an apparatus comprising:
- video signal input means for receiving a video signal from said video source;
- graphics signal input means for receiving a graphics signal from said computer graphics generator and for feeding said graphics signal to said combining means as a first of said two synchronized signals; and
- asynchronous converter means for converting said video signal to a modified video signal synchronized to said graphics signal and for feeding said modified video signal to said combining means as a second of said two synchronized signals, said asynchronous converter means comprising a dual port framestore buffer having an input port coupled to said video signal input means for inputting said video signal into said framestore buffer, and an output port for asynchronously outputting said modified video signal in synchronization with said graphics signal.

3. Apparatus according to claim 2, wherein said framestore buffer comprises a first dual port fieldstore having an input port and an output port, a second dual port fieldstore having an input port and an output port, a fieldstore input selector coupled to said input ports of said first and second fieldstore for selecting the fieldstore to which said video signal is inputted, and a fieldstore output selector coupled to said output ports of said first and second fieldstores for selecting from which fieldstore said modified video signal is outputted.

4. Apparatus according to claim 3, further comprising control means coupled to said fieldstore input selector for controlling said fieldstore input selector to alternate between said first and second fieldstores on each complete field of video signal.

5. Apparatus according to claim 4, wherein said control means is coupled to said fieldstore output selector for controlling said output selector to select the opposite fieldstore to the fieldstore selected by said fieldstore input selector.

6. Apparatus according to claim 2, wherein said asynchronous converter means includes means coupled between said video signal input means and said framestore buffer for sub-sampling said video signal to reduce the horizontal scale of said video signal.

7. Apparatus according to claim 6, further comprising filter means coupled to said sub-sampling means for preventing sub-sampling aliasing.

8. Apparatus according to claim 2, wherein said asynchronous converter means includes means coupled between said video signal input means and said framestore buffer for sub-sampling said video signal to reduce the vertical scale of said video signal.

9. Apparatus according to claim 2, wherein said asynchronous converter means includes means coupled to said output of said framestore buffer for interpolating said modified video signal to increase the vertical scale of said modified video signal.

10. Apparatus according to claim 2, wherein said asynchronous converter includes means coupled between said video signal input means and said framestore buffer for sub-sampling said video signal to reduce the vertical scale of said video signal when the number lines for display of said video signal on said display monitor is less than the number of lines in said video image, said asynchronous converter means including means coupled to said output of said framestore means for interpolating said modified video signal to increase the vertical scale of said modified video signal when the number of lines for display of said video signal on said display monitor is greater than the number of lines in said video image.

11. Apparatus according to claim 2, further comprising synchroniser timing means having an input coupled to said graphics signal input, and a timing signal output synchronised to said graphics signal and coupled to said framestore buffer to output said modified video signal in synchronisation with said graphics signal.

12. In a system for combining a video image from a video source and a computer graphics image from a computer graphics generator, on a display monitor, said system including combining means for producing from two synchronized signals a combined signal for display on said display monitor, an apparatus comprising:
- video signal input means for receiving a video signal from said video source;
- graphics signal input means for receiving a graphics signal from said computer graphics generator and for feeding said graphics signal to said combining means as a first of said two synchronized signals;
- asynchronous converter means for converting said video signal to a modified video signal synchronized to said graphics signal and for feeding said modified video signal to said combining means as a second of said two synchronized signals;
- synchronizer timing means having an input coupled to said graphics signal input, and a timing signal output synchronized to said graphics signal and coupled to said asynchronous converter means for controlling said asynchronous converter means to output said modified video signal in synchronization with said graphics signal.

13. Apparatus according to claim 12, wherein said synchroniser timing means includes means for generating horizontal and vertical sync pulses for said display monitor.

14. Apparatus according to claim 13, wherein said synchroniser timing means includes horizontal pulse generator means for generating timing pulses for controlling said asynchronous converter means, and for generating horizontal sync pulses for said monitor.

15. Apparatus according to claim 14, wherein said horizontal pulse generator means includes a phase locked loop coupled to said graphics signal input for synchronising said outputs of said horizontal pulse generating means to said graphics signal.

16. Apparatus according to claim 15, further comprising means for controlling said phase locked loop for altering the aspect ratio of said modified video signal being outputted from said asynchronous converter means.

17. Apparatus according to claim 13, wherein said synchroniser timing means includes vertical pulse generating means for generating vertical sync pulses for said display monitor, said vertical pulse generator comprising a counter coupled to said horizontal pulse generator for counting horizontal timing pulses, said vertical pulse generator further comprising means for generating a said vertical sync pulse whenever the value in said counter exceeds a predetermined modulus.

18. Apparatus according to claim 17, wherein said vertical pulse generator includes means for adjusting the value of said modulus for synchronising said output of said vertical pulse generator to said graphics signal.

19. Apparatus according to claim 12, wherein said asynchronous converter means comprises a dual port framestore buffer having an input port coupled to said video signal input means for inputting said video signal into said framestore buffer means, and an output port for outputting said modified video signal.

20. In a system for combining a video image from a video source and a computer graphics image from a computer graphics generator, on a display monitor, an apparatus comprising:
   video signal input means for receiving a video signal from said video source;
   graphics signal input means for receiving a graphics signal from said computer graphics generator;
   asynchronous converter means having a signal input coupled to said video signal input means and a control input coupled to said graphics signal input means for converting said video signal to a modified video signal synchronised to said graphics signal;
   mixer means having a graphics input coupled to said graphics signal input means, a video input coupled to said asynchronous converter means, and an output for coupling to said display monitor, said mixer means combining said graphics signal and said modified video signal, pixel-by-pixel, according to an attribute of said graphics signal, to produce a combined output signal.

21. Apparatus according to claim 20, wherein said mixer means includes means coupled to said graphics signal input means for producing a video fade signal from said attribute of said graphics signal, and means coupled to said video fade signal producing means for attentuating the level of said modified video signal in said mixer means in response to said video fade level.

22. Apparatus according to claim 20, wherein said mixer means includes means coupled to said graphics signal input means for producing a graphics fade signal from said attribute of said graphics signal, and means coupled to said graphics fade signal producing means for attenuating the level of said graphics signal in said mixer means in response to said graphics fade level.

23. Apparatus according to claim 20, wherein said mixer means includes means coupled to said graphics signal input means for producing a video saturation signal from said attribute of said graphics signal, and means coupled to said saturation signal for adjusting the saturation of said modified video signal in said mixer means in response to said saturation signal.

24. Apparatus according to claim 20, wherein said mixer means includes palette means for storing control values associated with said attribute of said graphics signal.

25. Apparatus according to claim 20, wherein said mixer means includes in-window generator means for generating a signal, pixel-by-pixel, indicative of whether the pixel position is inside or outside a window in which video is displayed, said in-window generator being coupled to control said mixer to blank said modified video signal in said mixer for pixel positions outside said video display window.

26. Apparatus according to claim 25, wherein said mixer means includes palette means for storing control values associated with said attribute of said graphics signal, said in-window generator means being coupled to said palette means to address an overlay palette at pixel positions outside said video display window, said overlay palette causing display of only said graphics signal at the pixel position.

27. Apparatus according to claim 25, wherein said in-window generator means comprises a bit-plane containing for each pixel position a logical value depending on whether the pixel position is inside said video display window.

28. A method of combining a video image from a video source and a computer graphics image from a computer graphics generator, on a display monitor, comprising the steps of:
   asynchronously converting said video signal to a modified video signal synchronised to said graphics signal;
   combining said modified video signal with said graphics signal, pixel-by-pixel, according to an attribute of said graphics signal; and
   feeding said combined signal to said display monitor.

29. In a system for combining a video image from a video source and a computer graphics image from a computer graphics generator, on a display monitor, an apparatus comprising:
   video signal input means for receiving a video signal from said video source;
   graphics signal input means for receiving a graphic signal from said computer graphics generator;
   framestore buffer means having a signal input coupled to said video signal inputs for converting said video signal to a modified signal synchronised to said graphic signal;
   mixer means coupled to said framestore buffer means and to said graphics input means for producing a combined signal from said modified video signal and said graphics signal; and
   means coupled to said mixer means for feeding said combined signal to said display monitor.

30. Apparatus according to claim 29, wherein said framestore buffer means comprises a FIFO shift register.

* * * * *